(12) United States Patent
Imaoka

(10) Patent No.: US 10,620,411 B2
(45) Date of Patent: Apr. 14, 2020

(54) IMAGING OPTICAL SYSTEM AND IMAGE PROJECTION APPARATUS

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/137,637

(22) Filed: Sep. 21, 2018

(65) Prior Publication Data
US 2019/0025561 A1 Jan. 24, 2019

Related U.S. Application Data

(63) Continuation of application No. PCT/JP2017/017794, filed on May 11, 2017.

(30) Foreign Application Priority Data

May 13, 2016 (JP) .................. 2016-096657

(51) Int. Cl.
*G02B 15/20* (2006.01)
*G02B 13/18* (2006.01)
(Continued)

(52) U.S. Cl.
CPC ............. *G02B 15/20* (2013.01); *G02B 13/16* (2013.01); *G02B 13/18* (2013.01); *G02B 15/173* (2013.01);
(Continued)

(58) Field of Classification Search
CPC .... G03B 21/28; G03B 21/142; G02B 13/009; G02B 13/16; G02B 13/18; G02B 13/0045;
(Continued)

(56) References Cited

U.S. PATENT DOCUMENTS

| 6,450,648 | B1* | 9/2002 | Ohzawa ............... | G03B 21/147 353/70 |
| 2011/0285896 | A1* | 11/2011 | Mihara ................ | G02B 15/173 348/345 |

(Continued)

FOREIGN PATENT DOCUMENTS

| JP | 2010-122574 | 6/2010 |
| JP | 2014-170129 | 9/2014 |
| JP | 2015-179270 | 10/2015 |

OTHER PUBLICATIONS

International Search Report of PCT application No. PCT/JP2017/017794 dated Aug. 8, 2017.

*Primary Examiner* — Sultan Chowdhury
(74) *Attorney, Agent, or Firm* — Wenderoth, Lind & Ponack, L.L.P.

(57) ABSTRACT

An imaging optical system includes a plurality of lens groups each moving such that spaces between each one of the plurality of lens groups change during a zooming. The imaging optical system conjugates a conjugate point on a magnification side and an intermediate imaging position, and conjugates a conjugate point on a reduction side and the intermediate imaging position. The imaging optical system includes a first lens group located at a furthest place on the magnification side and a rear group in this order from the magnification side toward the reduction side. The first lens group includes a field curvature correction lens group moving along an optical axis when an amount of a field curvature is changed, and a focusing lens group. The imaging optical system satisfies condition (4) below:

$$|\{(1-\beta cw^2)\times\beta crw^2\}/\{(1-\beta fw^2)\times\beta frw^2\}|<0.2 \qquad (4)$$

19 Claims, 15 Drawing Sheets

(51) Int. Cl.
*G02B 15/173* (2006.01)
*G02B 13/16* (2006.01)
*G02B 27/00* (2006.01)
*G03B 21/14* (2006.01)

(52) U.S. Cl.
CPC ....... *G02B 27/0068* (2013.01); *G03B 21/142* (2013.01)

(58) Field of Classification Search
CPC ........ G02B 15/14; G02B 15/16; G02B 15/01; G02B 15/20; G02B 15/161; G02B 15/173; G02B 15/177
See application file for complete search history.

(56) References Cited

U.S. PATENT DOCUMENTS

| | | | |
|---|---|---|---|
| 2014/0327888 A1* | 11/2014 | Kawana | G02B 13/16 353/88 |
| 2015/0268453 A1 | 9/2015 | Oe et al. | |
| 2016/0231545 A1* | 8/2016 | Machida | G02B 15/173 |
| 2018/0157011 A1 | 6/2018 | Oe et al. | |

\* cited by examiner

IMAGING OPTICAL SYSTEM AND IMAGE PROJECTION APPARATUS

BACKGROUND

Technical Field

The present disclosure relates to an imaging optical system that forms an image through a lens system including multiple lens elements, and also relates to an image projection apparatus including the imaging optical system.

Background Art

Patent literature 1 discloses a lens system that receives light from an input side to form an intermediate image, and then forms a final image on an output side. This lens system includes a first optical system and a first sub-system that allows the first optical system to bring an object into focus. The first sub-system includes a first lens and a second lens. The first lens is placed on the intermediate image at the closest position to the input side, and moves during the focusing action. The second lens is placed on the intermediate image at the closest position to an output side, and moves during the focusing action. The structure discussed above allows achieving a focusing function more excellent than before.

CITATION LIST

Patent Literature

PTL: Unexamined Japanese Patent Application Publication No. 2015-179270

SUMMARY

The present disclosure provides an imaging optical system excellent in focusing performance, and also provides an image projection apparatus including the imaging optical system.

The imaging optical system includes a plurality of lens groups, the plurality of lens groups each including at least one lens and moving such that spaces between each one of the lens groups change during a zooming action. The imaging optical system conjugates a conjugate point on a magnification side of the imaging optical system and an intermediate imaging position inside the imaging optical system, and conjugates a conjugate point on a reduction side of the imaging optical system and the intermediate imaging position. The imaging optical system includes a first lens group located at a furthest place on the magnification side and a rear group in this order from the magnification side toward the reduction side. The first lens group includes a field curvature correction lens group moving along an optical axis when an amount of a field curvature is changed, and a focusing lens group moving along the optical axis during a focusing action from an infinity focus state to a proximate focus state. The imaging optical system satisfies condition (4) below:

$$|\{(1-\beta_{cw}^2)\times\beta_{crw}^2\}/\{(1-\beta_{fw}^2)\times\beta_{frw}^2\}|<0.2 \quad (4)$$

where, $\beta_{cw}$ is a paraxial lateral magnification, at a wide angle end, of the field curvature correction lens group moving along the optical axis when the amount of the field curvature is changed, $\beta_{crw}$ is a paraxial lateral magnification, at the wide angle end, of every lens located farther on the reduction side than the field curvature correction lens group moving along the optical axis when the amount of the field curvature is changed, $\beta_{fw}$ is a paraxial lateral magnification, at the wide angle end, of the focusing lens group moving along the optical axis during the focusing action, and $\beta_{frw}$ is a paraxial lateral magnification, at the wide angle end, of every lens located farther on the reduction side than the focusing lens group moving along the optical axis during the focusing action.

The imaging optical system disclosed here can form an image excellent in imaging performance.

DESCRIPTION OF EMBODIMENTS

The embodiments will be detailed hereinafter with reference to the accompanying drawings. Descriptions more than necessary will be omitted sometimes. For instance, detailed descriptions of well-known matters will be omitted, or duplicable descriptions about substantially the same structures will be omitted sometimes. These omissions will avoid redundancy in the descriptions and help ordinary skilled persons in the art understand the present disclosure with ease.

The accompanying drawings and the descriptions below are provided for the ordinary skilled persons in the art to fully understand the present disclosure, and not to mention, these materials do not intend to limit the scope of the claims.

Figure 1:
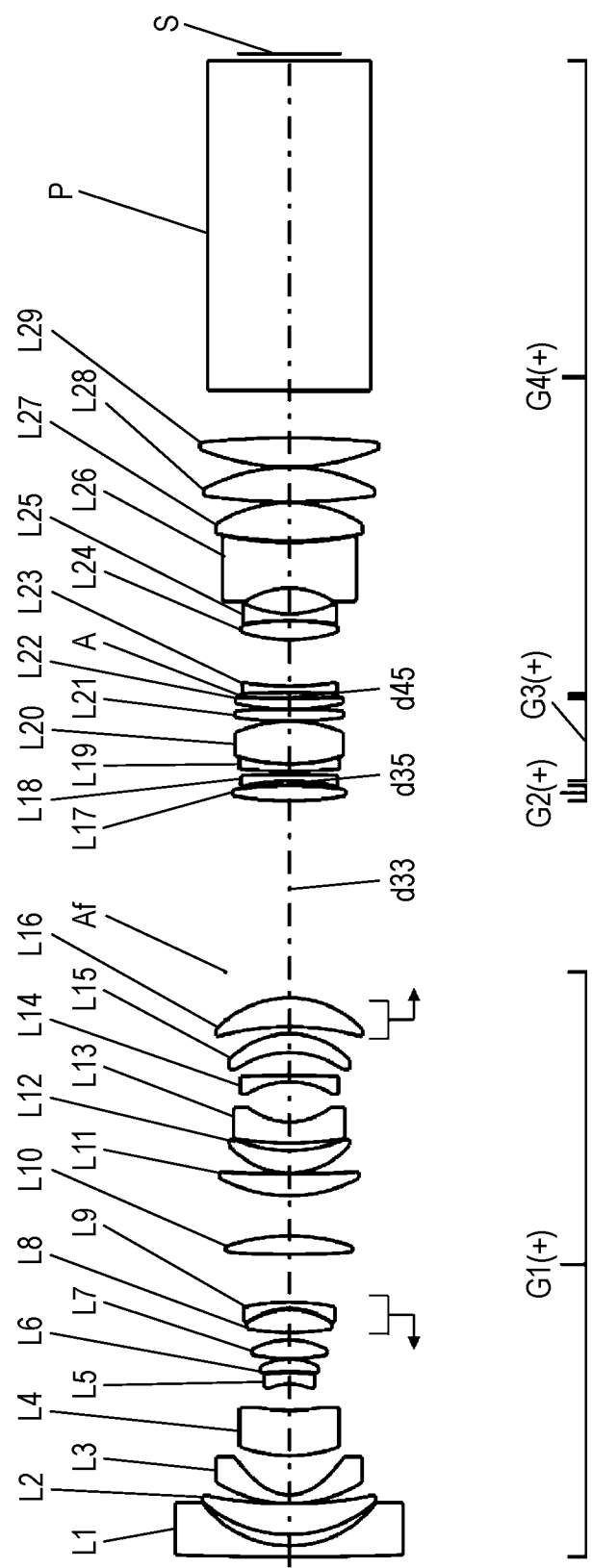
FIG. 1 shows a placement of lenses at a wide angle end, where an infinity focus state is achieved, of the imaging optical system in accordance with the first embodiment.
Figure 6:
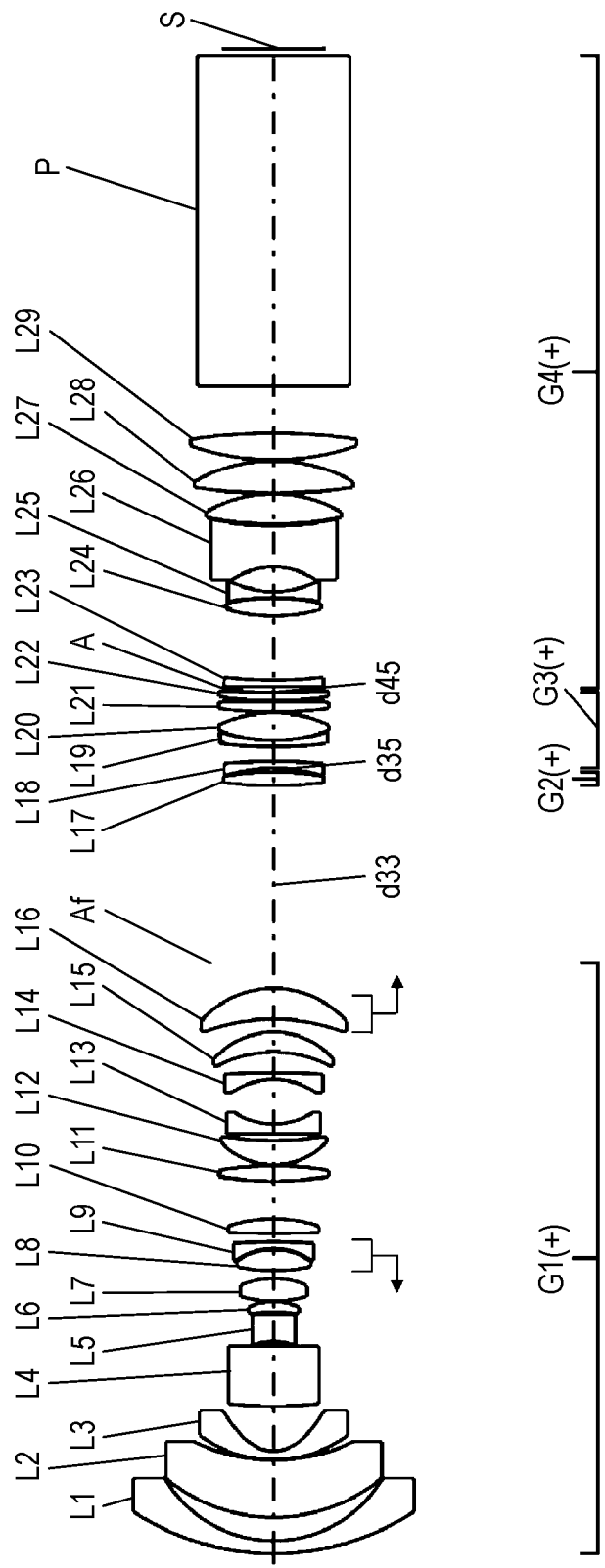
FIG. 6 shows a placement of lenses at a wide angle end, where an infinity focus state is achieved, of an imaging optical system in accordance with a second embodiment.
Figure 11:
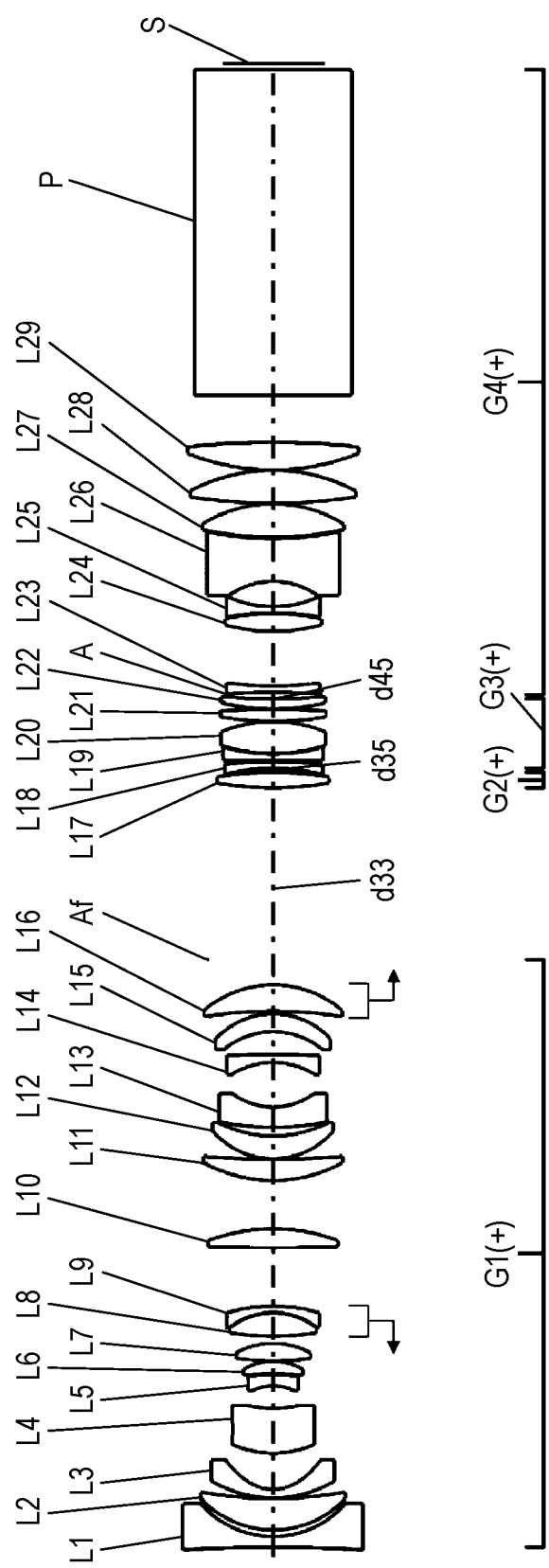
FIG. 11 shows a placement of lenses at a wide angle end, where an infinity focus state is achieved, of an imaging optical system in accordance with a third embodiment.

FIG. 1 shows a placement of lenses of the imaging optical system in accordance with the first embodiment. FIG. 6 shows a placement of lenses of the imaging optical system in accordance with the second embodiment. FIG. 11 shows a placement of lenses of the imaging optical system in accordance with the third embodiment. In each one of these three drawings, unilateral arrows marked below the lens-groups indicate that the lens-group is a focusing lens group, and the directions of the arrows indicate a moving direction of the focusing lens group from the infinity focus state to the proximity focus state. The left side indicates a magnification side, and the right side indicates a reduction side. The mark of (+), or (−) indicates a positive power or a negative power of each one of the lens-groups. The straight line marked on the right-most side indicates a position of subject image S. The letter "P" at the left side of subject image S indicates an optical element including such as a color separation prism, color combining prism, optical filter, plane parallel glass, crystal low-pass filter, or infrared cut filter.

Figure 2:
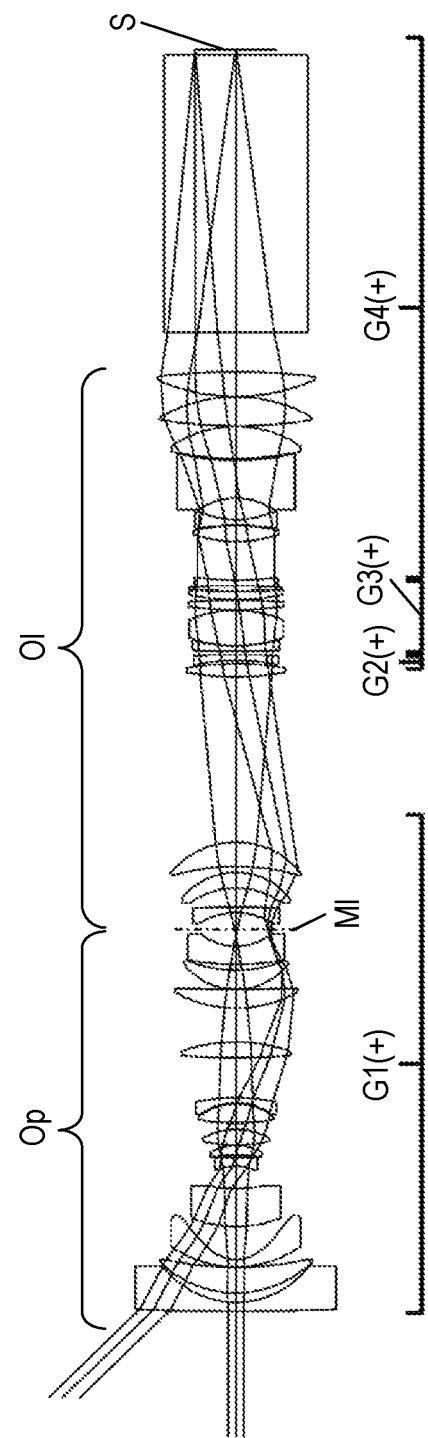
FIG. 2 shows a placement of lenses at a wide angle end for indicating a light path of the imaging optical system in accordance with the first embodiment.
Figure 7:
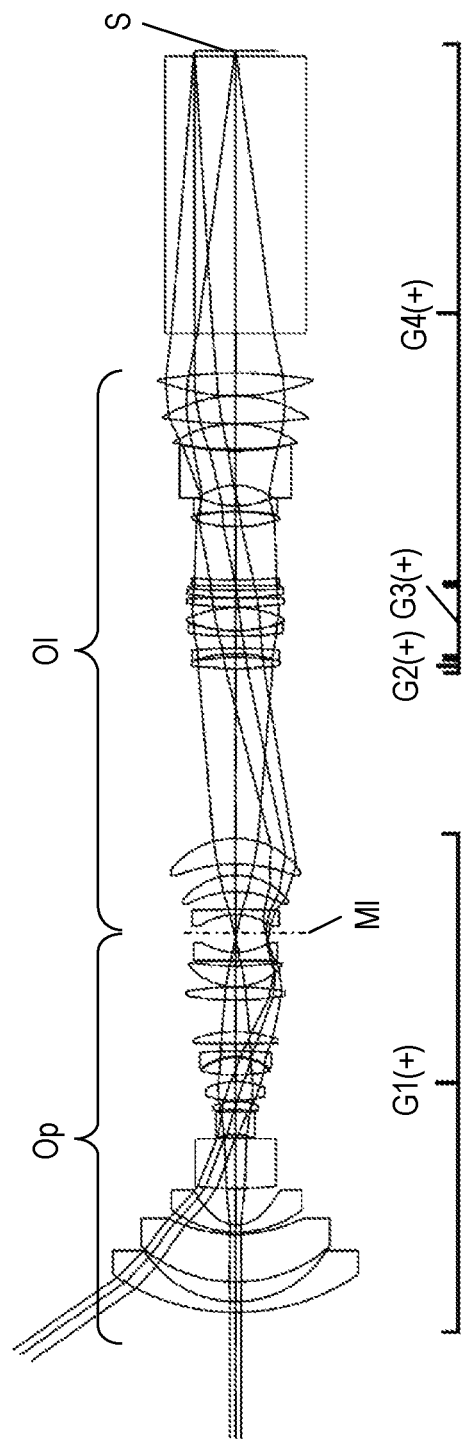
FIG. 7 shows a placement of lenses at a wide angle end for indicating a light path of the imaging optical system in accordance with the second embodiment.
Figure 12:
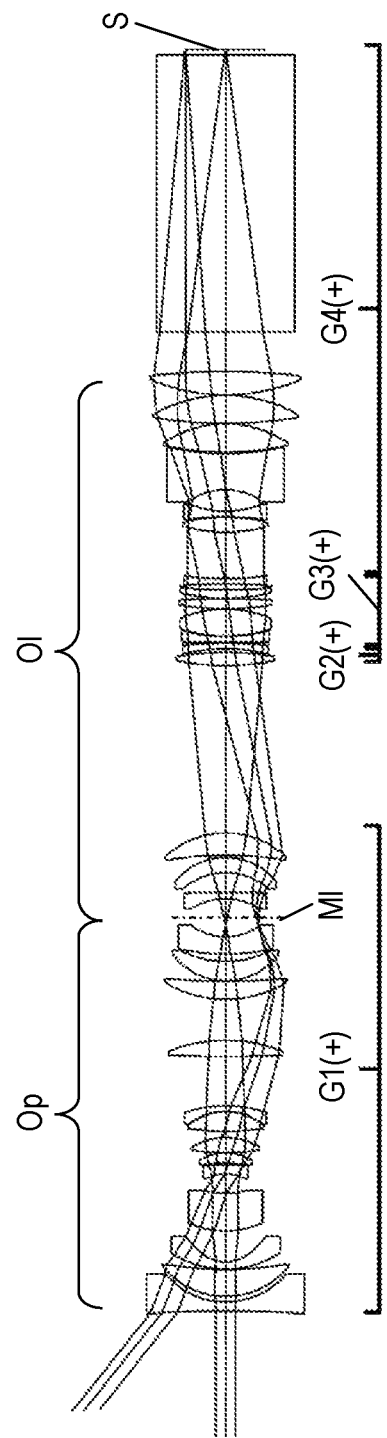
FIG. 12 shows a placement of lenses at a wide angle end for indicating a light path of the imaging optical system in accordance with the third embodiment.

FIG. 2 is an optical sectional view illustrating a light path of the imaging optical system in accordance with the first embodiment. FIG. 7 is an optical sectional view illustrating a light path of the imaging optical system in accordance with the second embodiment. FIG. 12 is an optical sectional view illustrating a light path of the imaging optical system in accordance with the third embodiment. MI indicates an intermediate imaging position, and forms a boundary between the magnification side and the reduction side. Magnifying optical system Op is disposed on the magnification side from MI, and relay optical system OI is disposed on the reduction side from MI. Magnifying optical system Op conjugates a magnification conjugate point (projected image) on the magnification side and intermediate imaging position MI inside the imaging optical system. Relay optical system OI conjugates a reduction conjugate point (subject image S) on the reduction side and intermediate imaging position MI inside the imaging optical system.

Figure 3:
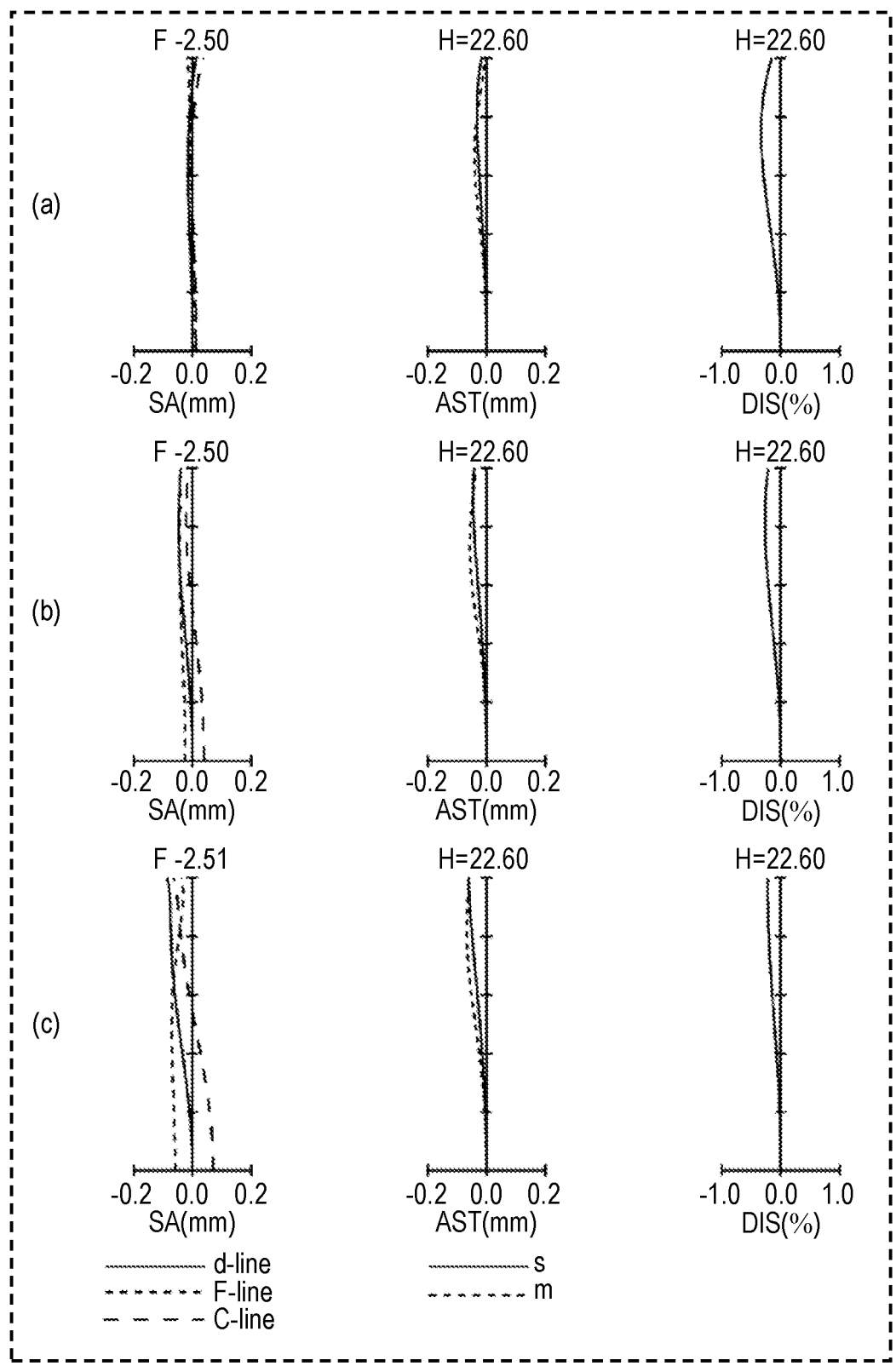
FIG. 3 shows longitudinal aberration diagrams each indicating that an object distance of the imaging optical system in accordance with the first embodiment is infinity.
Figure 8:
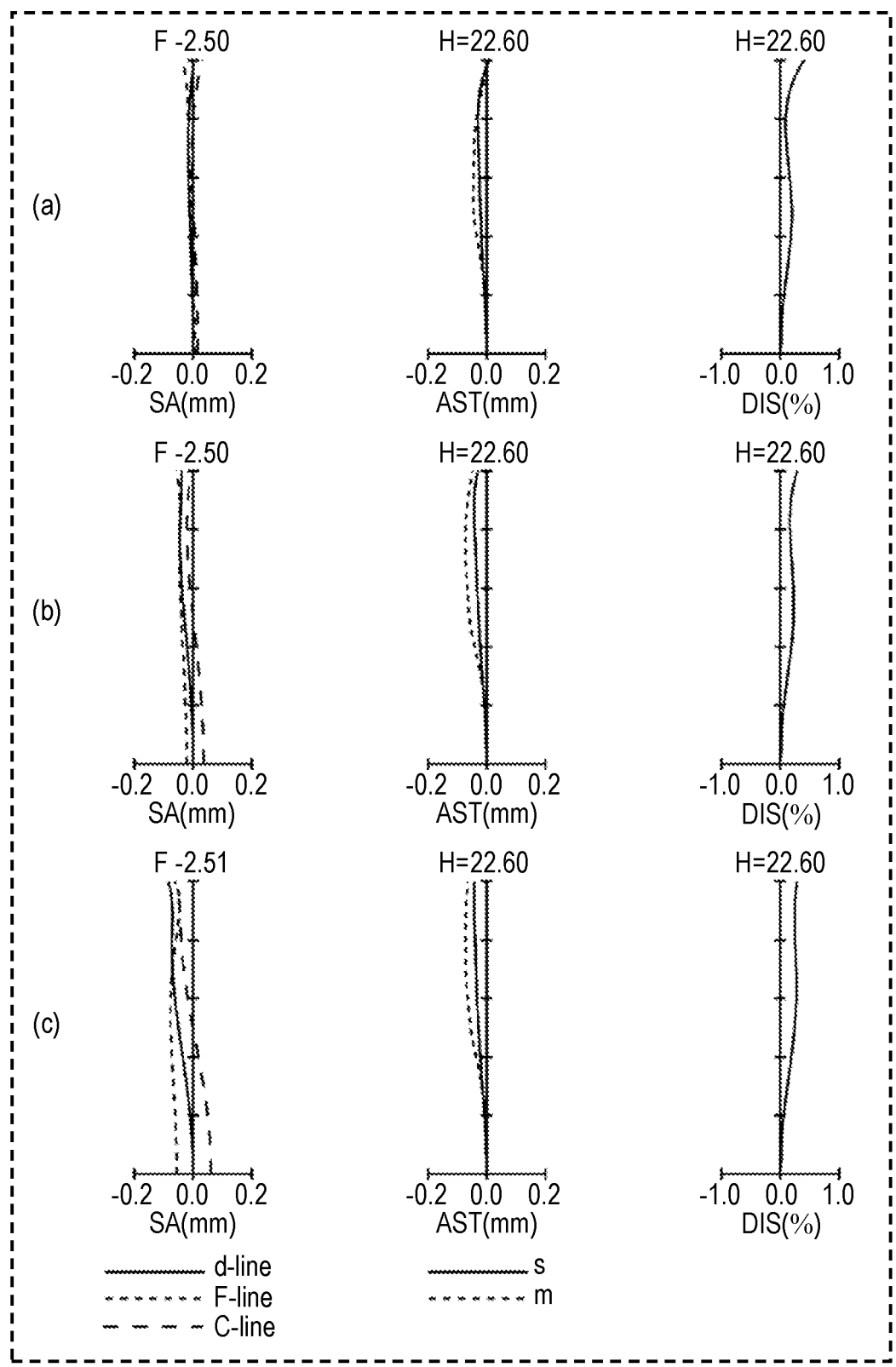
FIG. 8 shows longitudinal aberration diagrams each indicating that an object distance of the imaging optical system in accordance with the second embodiment is infinity.
Figure 13:
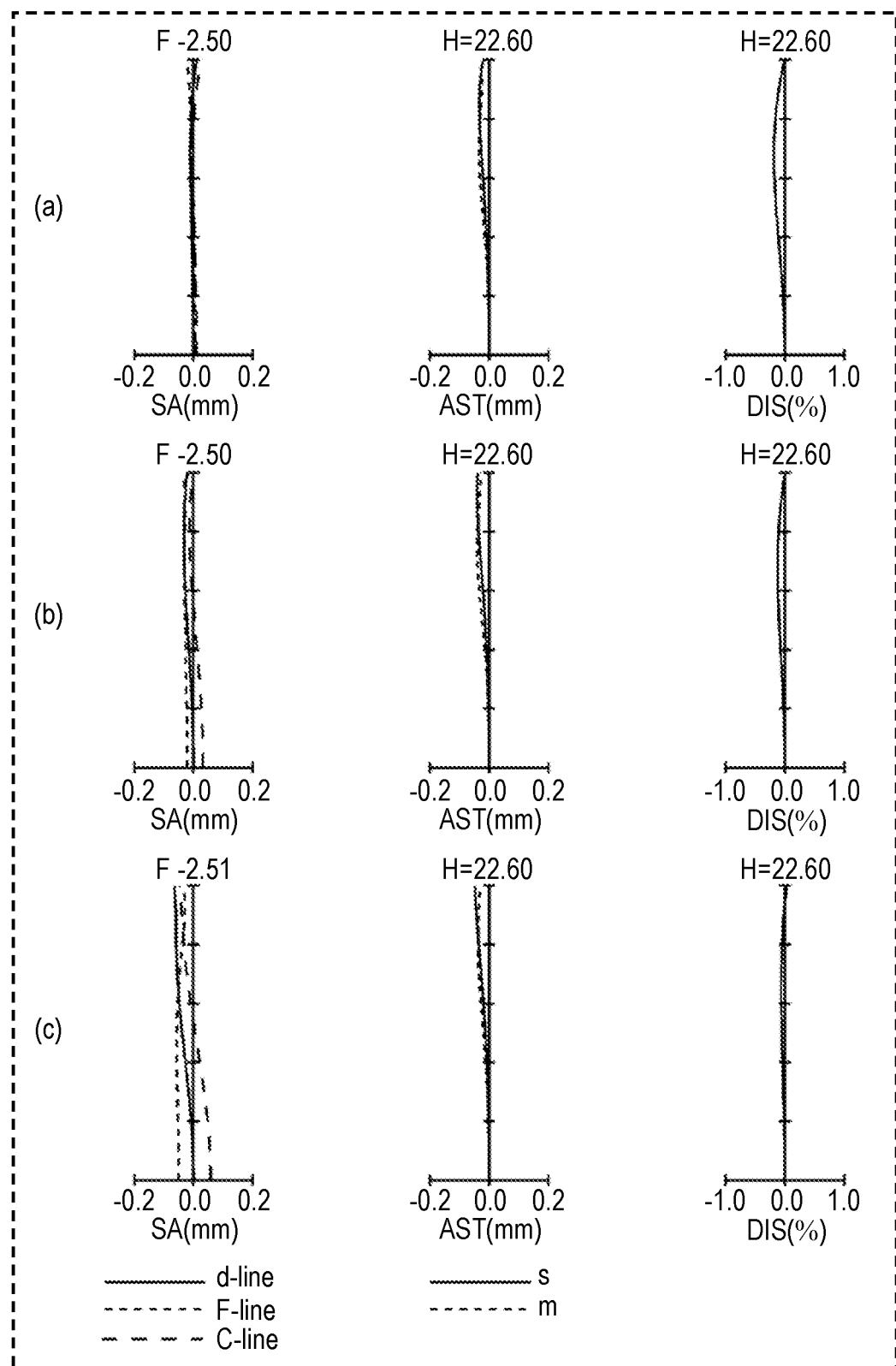
FIG. 13 shows longitudinal aberration diagrams each indicating that an object distance of the imaging optical system in accordance with the third embodiment is infinity.

FIG. 3 shows longitudinal aberration diagrams each indicating that an object distance of the imaging optical system in accordance with the first embodiment is infinity. FIG. 8 shows longitudinal aberration diagrams each indicating that an object distance of the imaging optical system in accordance with the second embodiment is infinity. FIG. 13 shows longitudinal aberration diagrams each indicating that an object distance of the imaging optical system in accordance with the third embodiment is infinity. The marks (a), (b), and (c) in each one of the diagrams indicate the aberration diagrams each of which focal length of the imaging optical system disclosed here is on an wide angle end, on an intermediate position, and on a telephoto end. The wide angle end refers to a state of the shortest focal length, the intermediate stat refers to a state of an intermediate focal length, and the telephoto end refers to a state of the longest focal length. Assume that focal length in the shortest focal length state is fw, and that in the longest focal length state is fr, then the following equation (1) prescribes the focal length fm in the intermediate focal length state:

$$fm = \sqrt{(f_W * f_T)}$$ Equation (1)

Figure 4:
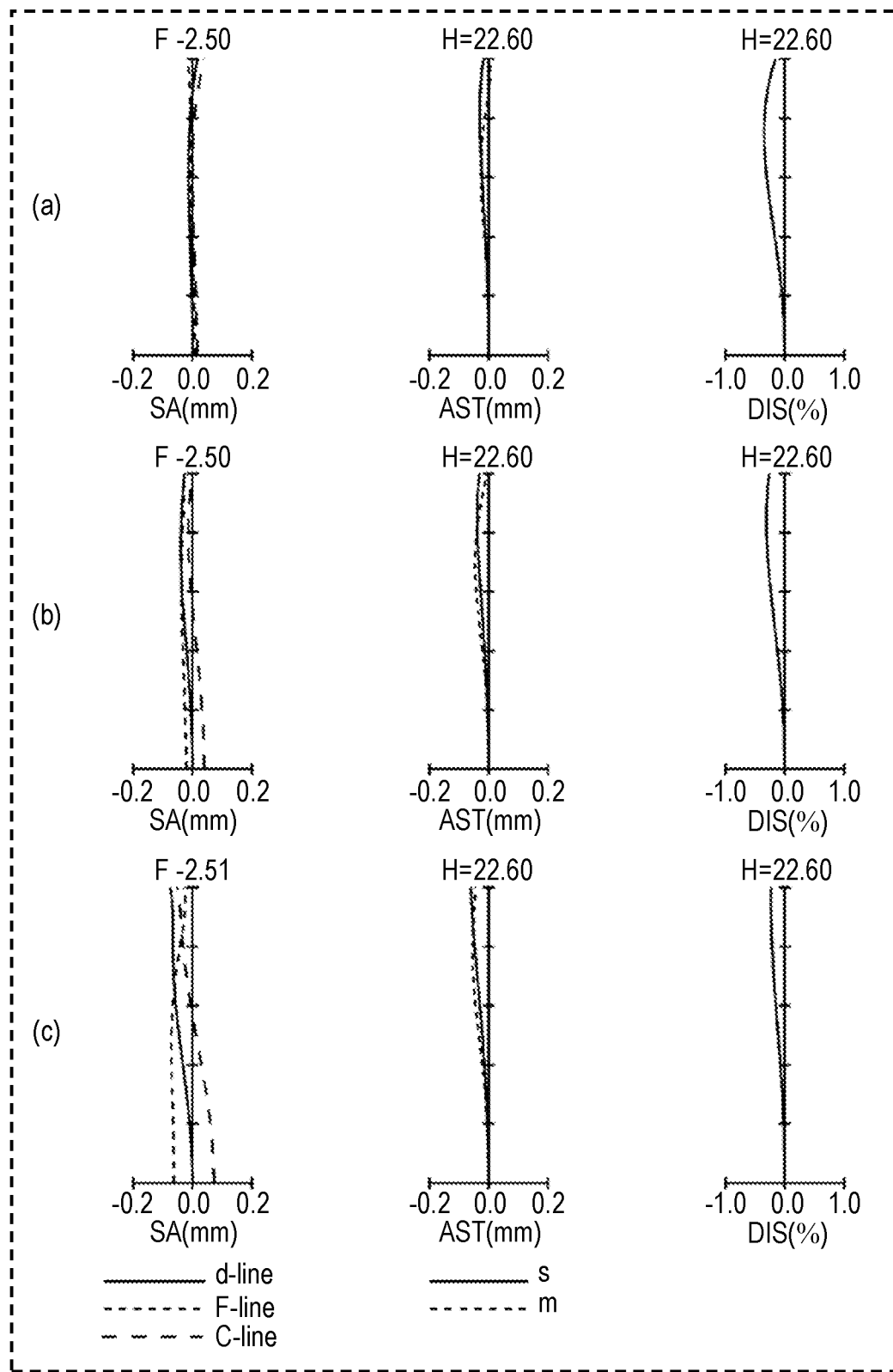
FIG. 4 shows longitudinal aberration diagrams at a projection size of 200 inches of the imaging optical system in accordance with the first embodiment.
Figure 9:
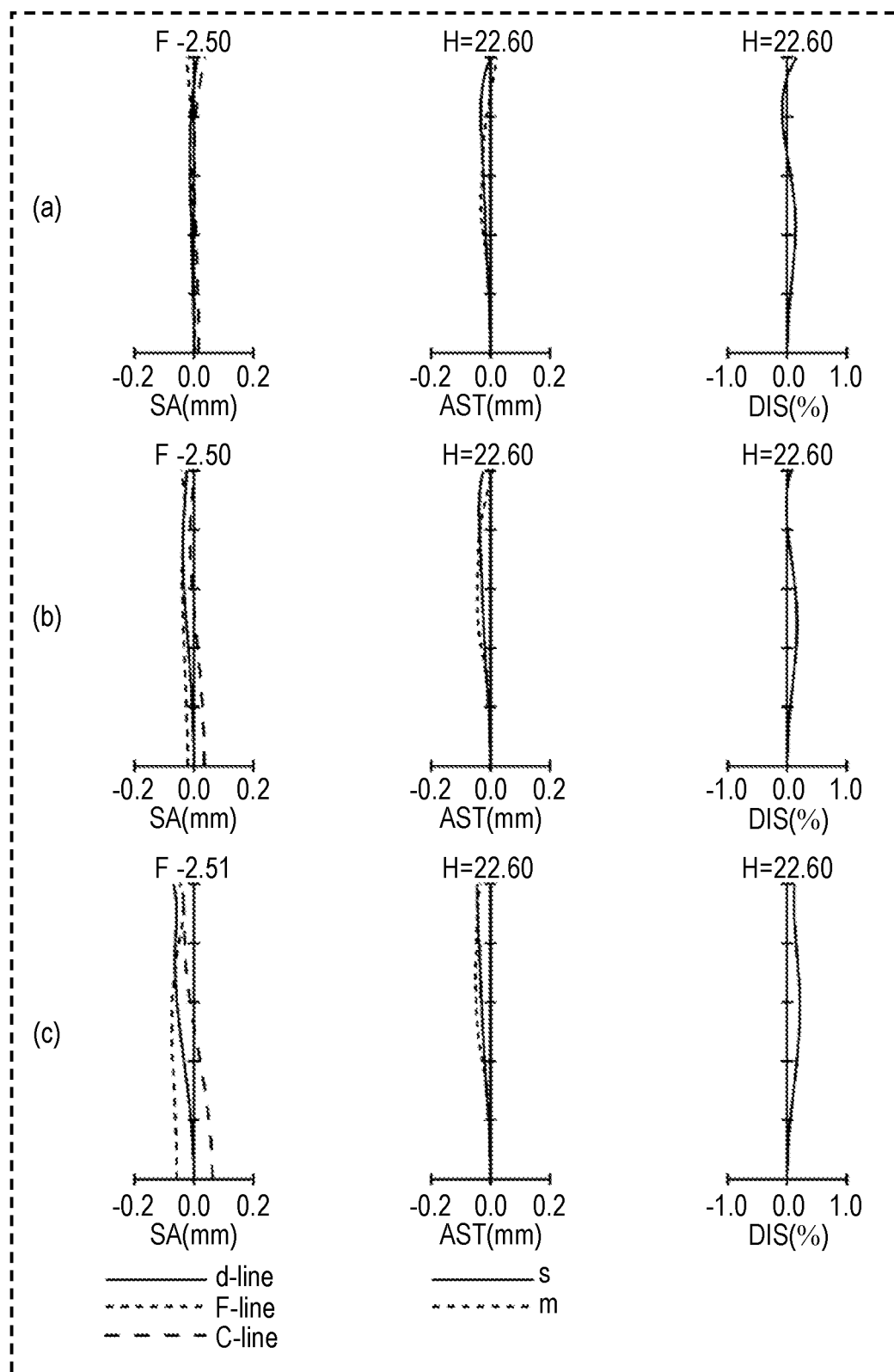
FIG. 9 shows longitudinal aberration diagrams at a projection size of 200 inches of the imaging optical system in accordance with the second embodiment.
Figure 14:
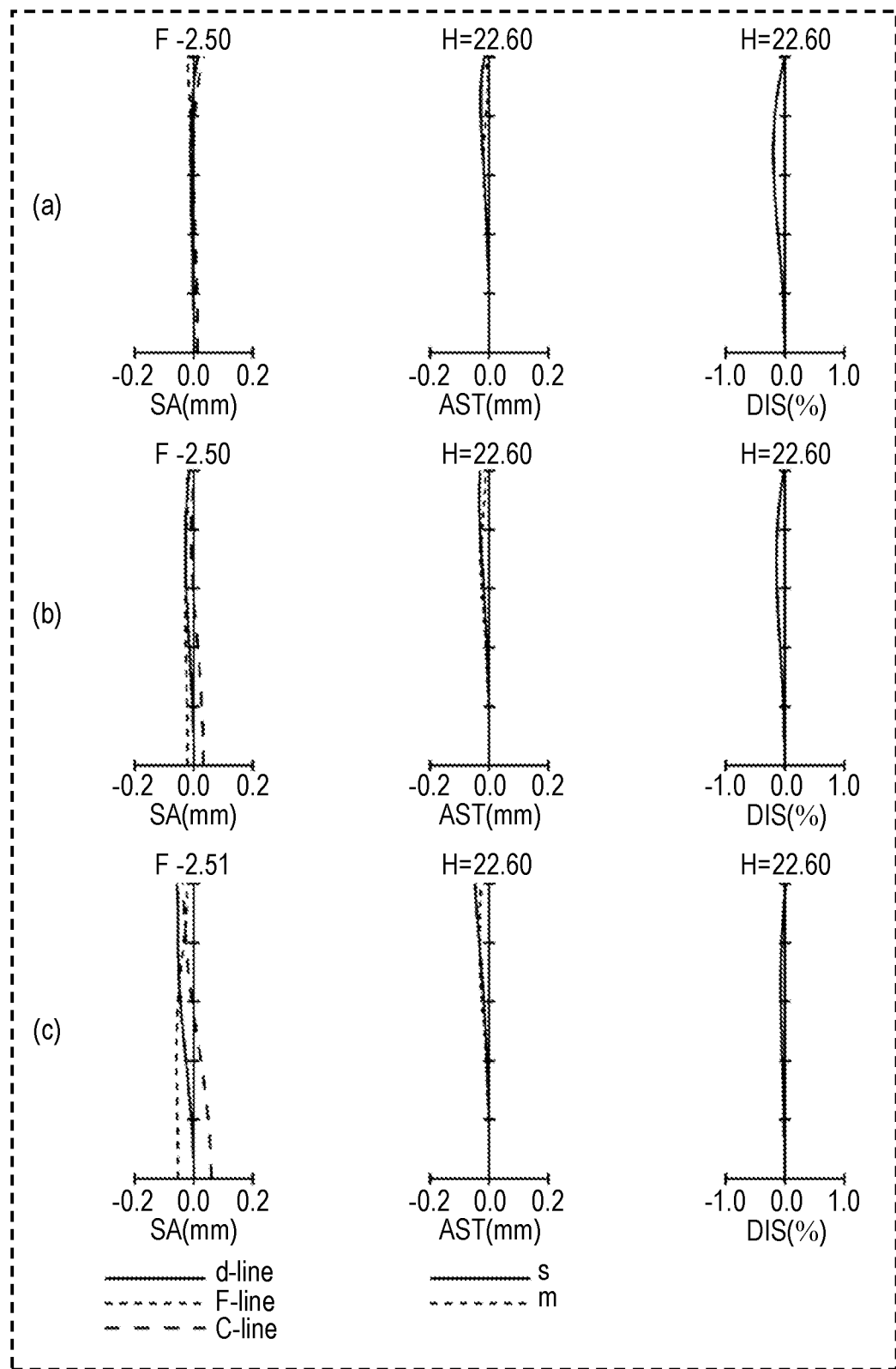
FIG. 14 shows longitudinal aberration diagrams at a projection size of 200 inches of the imaging optical system in accordance with the third embodiment.

FIG. 4 shows longitudinal aberration diagrams at a projection size of 200 inches (×145.1) of the imaging optical system in accordance with the first embodiment. FIG. 9 shows longitudinal aberration diagrams at a projection size of 200 inches (×145.1) of the imaging optical system in accordance with the second embodiment. FIG. 14 shows longitudinal aberration diagrams at a projection size of 200 inches (×145.1) of the imaging optical system in accordance with the third embodiment. The marks (a), (b), and (c) in each one of the diagrams indicate the aberration diagrams each of which focal length of the imaging optical system disclosed here is on an wide angle end, on an intermediate position, and on a telephoto end.

Figure 5:
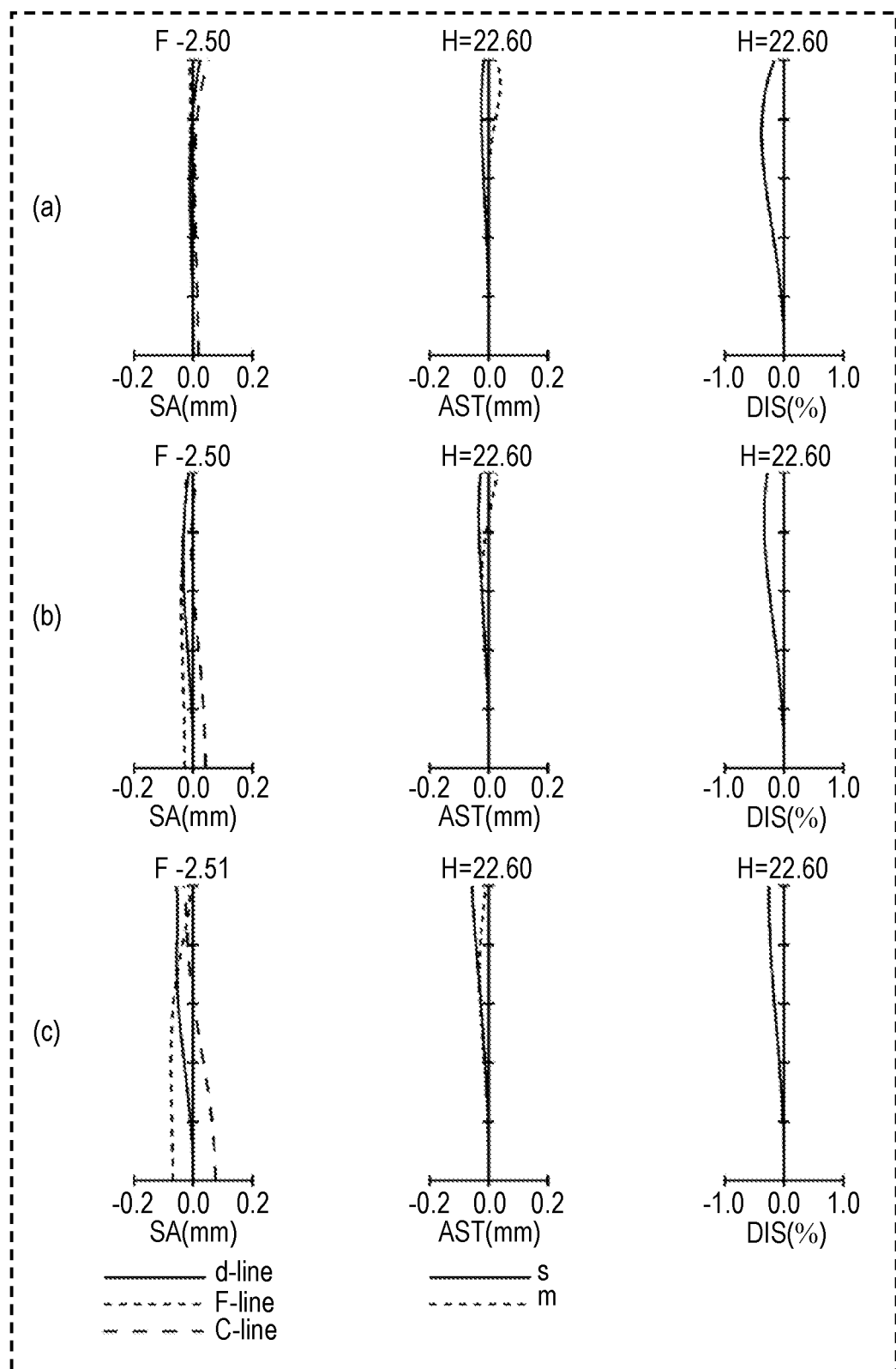
FIG. 5 shows longitudinal aberration diagrams at a projection size of 70 inches of the imaging optical system in accordance with the first embodiment.
Figure 10:
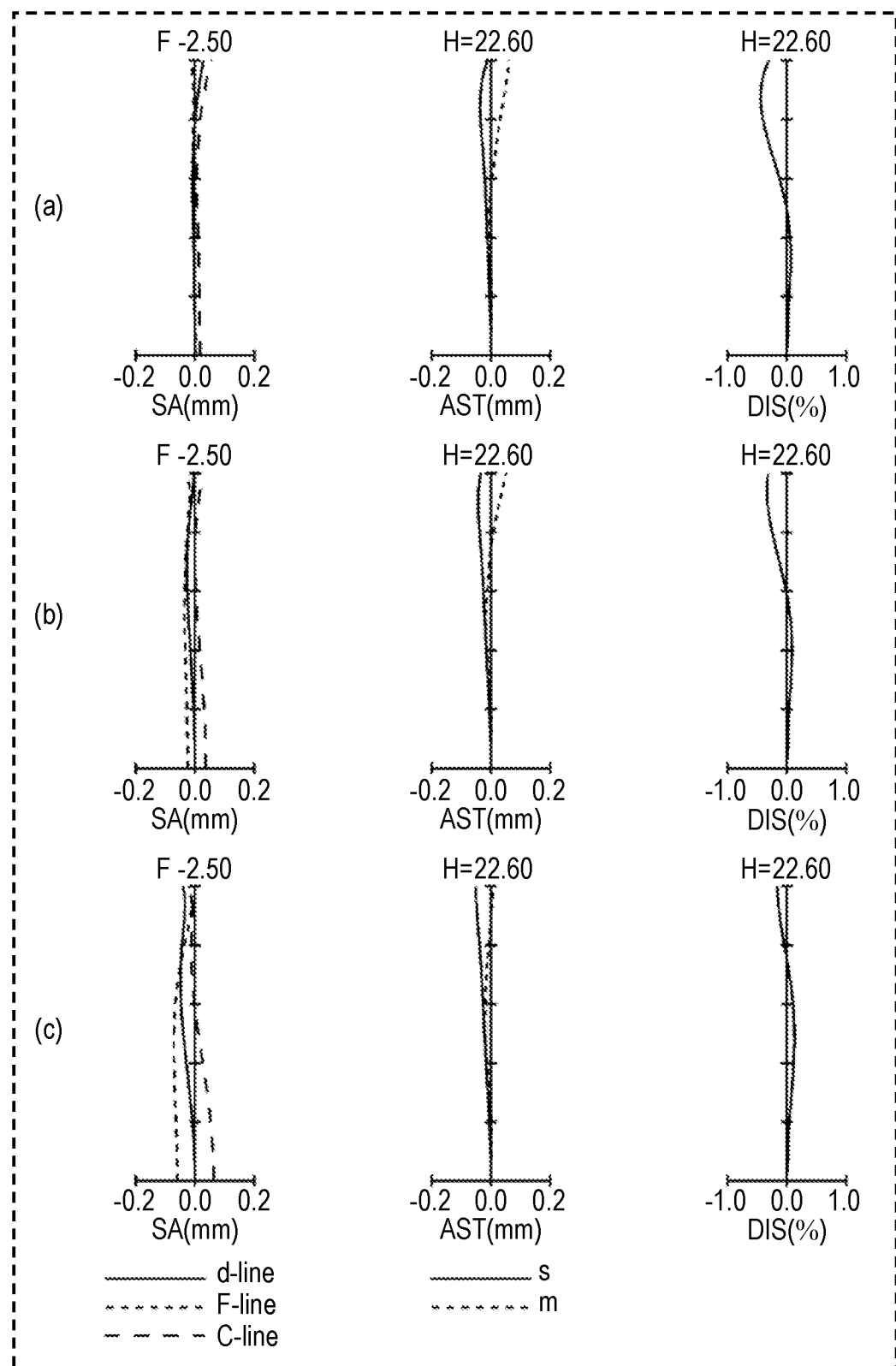
FIG. 10 shows longitudinal aberration diagrams at a projection size of 70 inches of the imaging optical system in accordance with the second embodiment.
Figure 15:
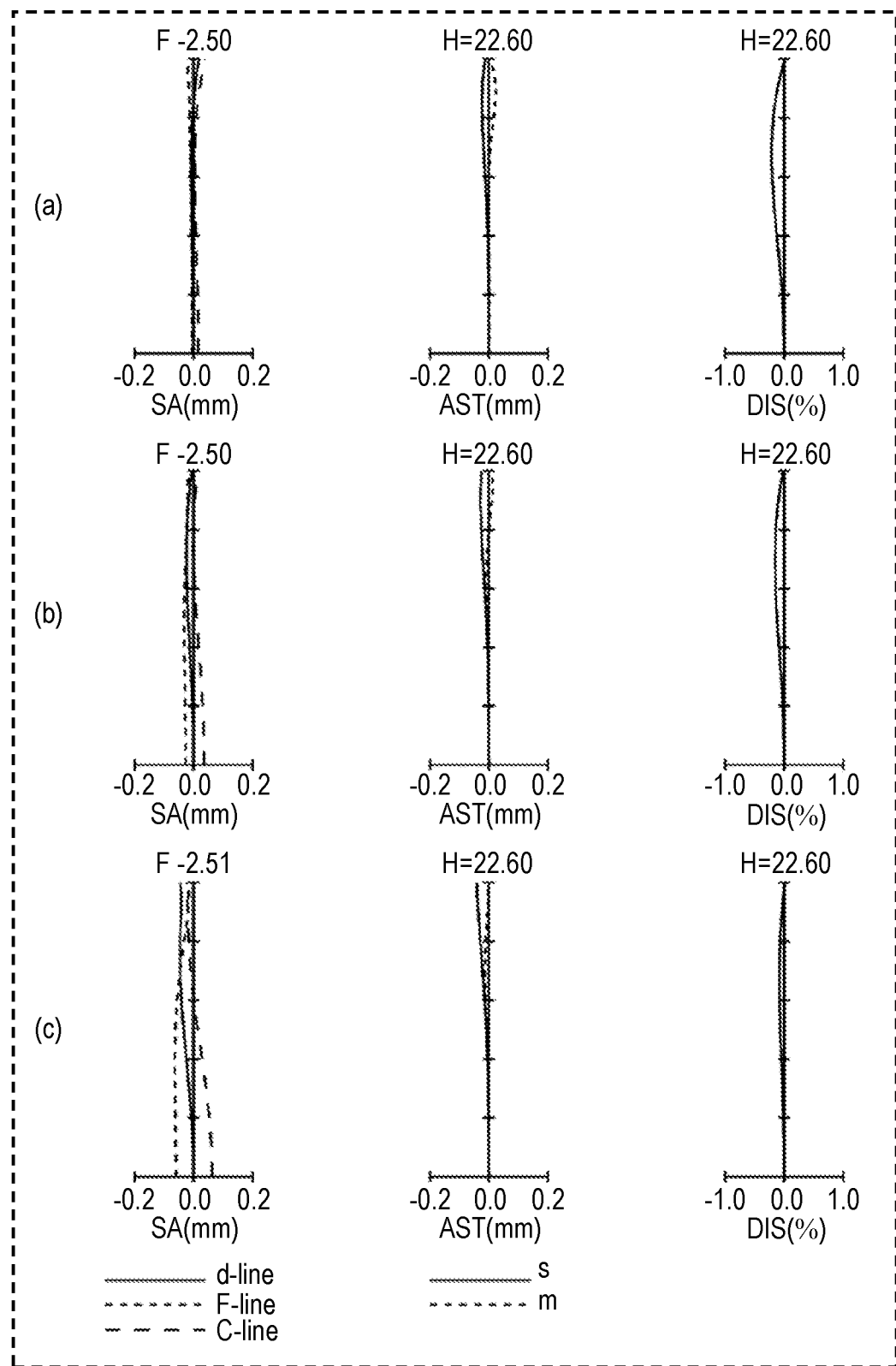
FIG. 15 shows longitudinal aberration diagrams at a projection size of 70 inches of the imaging optical system in accordance with the third embodiment.

FIG. 5 shows longitudinal aberration diagrams at a projection size of 70 inches (×50.8) of the imaging optical system in accordance with the first embodiment. FIG. 10 shows longitudinal aberration diagrams at a projection size of 70 inches (×50.8) of the imaging optical system in accordance with the second embodiment. FIG. 15 shows longitudinal aberration diagrams at a projection size of 70 inches (×50.8) of the imaging optical system in accordance with the third embodiment. The marks (a), (b), and (c) in each one of the diagrams indicate the aberration diagrams each of which focal length of the imaging optical system disclosed here is on an wide angle end, on an intermediate position, and on a telephoto end.

Each one of the aberration diagrams includes a spherical aberration diagram, astigmatism diagram, and distortion diagram in this order from the left to the right. In the spherical aberration diagram, the lateral axis represents the spherical aberration (SA mm), and the vertical axis represents F-number (numbers marked with F in the diagrams). In the spherical aberration diagram, the solid line, broken line, and long-dash line represent the characteristics of d-line, F-line, and C-line respectively. In the astigmatism diagram, the lateral axis represents the astigmatism (AST mm), and the vertical axis represents an image height (marked with H). In the astigmatism diagram, the solid line shows the characteristics of sagittal plane (marked with s), the broken line shows the characteristics of meridional plane (marked with m). In the distortion diagram, the vertical axis represents a distortion (DIS %), and the vertical axis represents an image height (marked with H).

In the embodiments below, a subject image, formed by an image forming element including such as liquid crystal or DMD (Digital Micro-mirror Device), is projected onto a screen by a projector (image projection apparatus), and this projector employs the imaging optical system. The screen (not shown) lies on an extension line of the magnification side. The imaging optical system magnifies subject image S formed by a liquid crystal panel disposed on the reduction side, and projects it onto the screen.

The imaging optical system disclosed here includes first lens group G1 of positive power, second lens group G2 of positive power, third lens group G3 of positive power, and fourth lens group G4 of positive power in this order from the magnification side to the reduction side.

First lens group G1 is formed of first front-side sub-lens group G1f and first rear-side sub-lens group G1r. First lens group G1 is formed of 16 lenses numbered first lens L1 through sixteenth lens L16. First front-side sub-lens group G1f is formed of third lens L3, which is an aspherical lens and located furthest on the magnification side among other aspherical lenses, and other lenses located farther on the magnification side than lens L3. First rear-side sub-lens group G1r is formed of the lenses disposed toward the reduction side from aspherical third lens L3.

First lens group G1 includes the following lenses located from the magnification side toward the reduction side in this order:

negative first lens L1;
positive meniscus second lens L2 of which convex faces toward the magnification side;
negative meniscus third lens L3 of which convex faces toward the magnification side;
positive meniscus fourth lens L4 of which convex faces toward the magnification side;
negative fifth lens L5;
positive meniscus sixth lens L6 of which convex faces toward the reduction side;
biconvex seventh lens L7;
biconvex eighth lens L8;
negative meniscus ninth lens L9 of which convex faces toward the reduction side;
biconvex tenth lens L10;
positive eleventh lens L11;
positive meniscus twelfth lens L12 of which convex faces toward the magnification side;
negative thirteenth lens L13;
negative meniscus fourteenth lens L14 of which convex faces toward the reduction side;
positive meniscus fifteenth lens L15 of which convex faces toward the reduction side; and
positive meniscus sixteenth lens L16 of which convex faces toward the reduction side.

Third lens L3 has an aspherical surface on the reduction side, and on its magnification side there are first lens L1 of negative power and second lens L2 of positive power. A greater effective diameter of the aspherical lens invites greater difficulty in manufacturing the aspherical lens. In the imaging optical system of the present disclosure, the aspherical surface is formed on third lens L3, whereby the curvature of field as well as the distortion can be reduced. On top of that, second lens L2 located next to lens L3 on the magnification side has positive power, so that the effective diameter of the aspherical lens can be reduced. Sixteenth lens L16 has positive power and moves along the optical axis during the focusing action, viz. it forms a focusing lens group.

First lens group G1 includes a field-curvature correction lens group formed of eighth lens L8 of positive power and ninth lens L9 of negative power. This correction lens group corrects a change in the field curvature, the change being incurred by the movements of each one of the lens groups during the focusing action. In this case, eighth lens L8 and ninth lens L9 move along the optical axis, and they can move toward the magnification side or the reduction side depending on a moving amount of the sixteenth lens L16 (i.e. focusing lens group) for focusing or a correction amount of the field curvature. Since the field curvature correction lens group is formed of one sheet of negative lens and one sheet of positive lens, this simple structure allows correcting the curvature of field as well as reducing a change in sensitivity of focusing.

Second lens group G2 is formed of biconvex seventeenth lens L17.

Third lens group G3 is formed of eighteenth lens L18 through twenty-second lens L22. Those lenses are located from the magnification side toward the reduction side in the following order:

negative meniscus eighteenth lens L18 of which convex faces toward the reduction side;
negative nineteenth lens L19;
biconvex twentieth lens L20;
biconvex twenty-first lens L21; and
positive meniscus twenty-second lens L22 of which convex faces toward the magnification side.

Between sixteenth lens L16 and seventeenth lens L17, flare-cut aperture M is placed.

Fourth lens group G4 is formed of aperture A, twenty-third lens L23 through twenty-ninth lens L29, and prism P. Those members are disposed from the magnification side toward the reduction side in the following order:

biconcave lens L23;
biconvex lens L24;
biconcave lens L25;
biconcave lens L26;
biconvex lens L27;
biconvex lens L28;
biconvex lens L29; and
prism P.

Fifth Lens L5 Desirably has the Specifications Below:

High transmittance, Abbe number<30, and absorption coefficient<0.008 at a wavelength of 400 nm of transmitted light.

This absorption coefficient can be found from the following expression:

$-1/t \times \ln(I/I_0)$ where, t is a travel distance of light through the lens, $I_O$ is an intensity of the light before it enters the lens, and I is an intensity of the light after it travels by distance t.

First lens L1 and third lens L3, both are of negative power, disposed on the magnification side of fifth lens L5 desirably have the following specifications:

Abbe number≥30, or

Absorption coefficient ≥0.008 at the wavelength=400 nm of transmitted light.

When the imaging optical system zooms from the wide angle end to the telephoto end, first lens group G1 is fixed relatively to an image surface of subject image S. Second lens group G2 simply moves toward the magnification side with respect to the image surface of subject image S. Third lens group G3 simply moves toward the magnification side with respect to the image surface of subject image S. Fourth lens group G4 is fixed relatively to the image surface of subject image S.

Then an intermediate image is formed at intermediate imaging position MI within first lens group G1. To be more specific, intermediate imaging position MI is located between thirteenth lines L13 and fourteenth lens L14. First lens group G1 carries out two actions here, viz. an action of a field lens for guiding marginal rays toward the reduction side before and after the intermediate imaging, and an action of a projection lens.

The imaging optical system in accordance with the present embodiment includes multiple lens-groups each having at least one lens. During a zooming action, the lens-groups move such that spaces between each one of the groups change. The imaging optical system conjugates a conjugate point on the magnification side and an intermediate imaging position inside the imaging optical system. The imaging optical system conjugates a conjugate point on the reduction side and the intermediate imaging position inside the imaging optical system. The imaging optical system includes the first lens group and a rear lens group in this order from the magnification side toward the reduction side. The first lens group is located furthest on the magnification side, and includes a field curvature correction lens group and a focusing lens group. The field curvature correction lens group moves along the optical axis for correcting an amount of field curvature. The focusing lens group moves along the optical axis during an action of focusing from an infinite focus state to a proximate focus state. The conditions that should be satisfied by the imaging optical system are introduced below:

First lens group G1 of the imaging optical system in accordance with the present disclosure satisfies the condition (1) below:

$$1.5 < f1b/f1 < 4.0 \tag{1}$$

where, f1$b$ is a focal length of first rear-side sub-lens group located farther on the reduction side than the aspherical lens located furthest on the magnification side in the first lens group, f1 is a focal length of the first lens group.

Condition (1) prescribes the relation between first rear-side sub-lens group G1$r$ and first lens group G1, where sub-lens group G1$r$ is located farther on the reduction side than the aspherical lens located furthest on the magnification side in first lens group G1. Satisfaction of condition (1) will invite this advantage: correcting the field curvature and the distortion easily with the effective diameter of aspherical third lens L3 being reduced. Falling below the lower limit of condition (1) allows the first rear-side sub-lens group G1$r$ located farther on the reduction side than third lens L3 to exert excessively strong power (greater refracting power), so that the corrections of the field curvature and the distortion become difficult. To the contrary, excess over the upper limit of condition (1) allows the first rear-side sub-lens group G1$r$ located farther on the reduction side than aspherical third lens L3 of first lens group G1 to exert extremely weak power, so that the effective diameter of aspherical third lens L3 adjacent to first rear-side sub-lens group G1$r$ becomes greater, which adversely invites a higher manufacturing cost.

Satisfaction of condition (1a) below more positively achieves the advantage discussed above.

$$2.0 < f1b/f1 < 3.5 \tag{1a}$$

The imaging optical system satisfies the condition (2) below.

$$0.01 < |d/fw| < 1.50 \tag{2}$$

where, d is a space on the optical axis between the lens of negative power and the lens of positive power located farther on the magnification side than the aspherical lens located furthest on the magnification side in the first lens group, and fw is a focal length of the total system at the wide angle end.

Condition (2) prescribes the spaces between each one of the lenses located farther on the magnification side than the aspherical lens of first lens group G1. Satisfaction of condition (2) will invite this advantage: reducing the effective diameters of the aspherical lens and other lenses located farther on the magnification side than the aspherical lens while the field curvature and the distortion are corrected improvingly. Falling below the lower limit of condition (2) will make a space too short between the negative lens and the positive lens located farther on the magnification side than the aspherical lens, so that the filed curvature and the distortion cannot be corrected sufficiently. To the contrary, excess over an upper limit of condition (2) will invite adversely a greater effective diameter of the aspherical lenses and other lenses located farther on the magnification side.

On top of that, satisfaction of condition (2a) below more positively achieves the foregoing advantage.

$$0.05 < |d/fw| < 1.00 \tag{2a}$$

The imaging optical system in accordance with the present disclosure satisfies the condition (3) below:

$$0.5 < (R1f + R1r)/(R1f - R1r) < 5.0 \tag{3}$$

where, R1$f$ is a curvature radius of the surface, facing the magnification side, of the spherical lens of negative power located farther on the magnification side than the aspherical lens located furthest, among other aspherical lenses, on the magnification side, and R1$r$ is a curvature radius of the surface, facing the reduction side, of the spherical lens of negative power located farther on the magnification side than the aspherical lens located furthest, among other aspherical lenses, on the magnification side.

Condition (3) prescribes a shaping factor of the spherical lenses of negative power located farther on the magnification side than the aspherical lens. Satisfaction of condition (3) will invite this advantage: reducing the effective diameters of the lenses while the field curvature and the distortion can be corrected. Falling below the lower limit of condition (3) will invite an insufficient correction of the field curvature and the distortion. To the contrary, excess of the upper limit of condition (3) will invite adversely greater effective diameters of the lenses located farther on the magnification side than the aspherical lens.

Satisfaction of condition (3a) below more positively achieves the foregoing advantage.

$$0.7 < (R1f + R1r)/(R1f - R1r) < 3.5 \tag{3a}$$

The imaging optical system of the present disclosure satisfies condition (4) below:

$$|\{(1-\beta cw^2) \times \beta crw^2\}/\{(1-\beta fw^2) \times \beta frw^2\}| < 0.2 \tag{4}$$

where, ßcw is a paraxial lateral magnification, at a wide angle end, of a field curvature correction lens-group moving along the optical axis in the case of an amount of field curvature being changed, ßcrw is a paraxial lateral magnification, at the wide angle end, of each of the lenses located farther on the reduction side than the field curvature correction lens-group moving along the optical axis in the case of the amount of the field curvature being changed, ßfw is a paraxial lateral magnification, at the wide angle end, of the focusing lens-group moving along the optical axis during the focusing action, and ßfrw is a paraxial lateral magnification, at the wide angle end, of every lens located farther on the reduction side than the focusing lens-group moving along the optical axis during the focusing action.

Condition (4) relates to focusing sensitivities of the field curvature lens group and the focusing lens group. Satisfaction of condition (4) will invite this advantage: preventing the focus from being out of focus even if the field curvature correction lens-group is moved during the adjustment of an amount of field curvature. Excess over an upper limit of condition (4) will invite an out-of-focus when the field curvature correction lens-group is moved, so that the correction of the field curvature and the focusing become difficult.

Satisfaction of condition (4a) below more positively achieves the foregoing advantage.

$$|\{(1-\beta cw^2) \times \beta crw^2\}/\{(1-\beta fw^2) \times \beta frw^2\}| 0.15 \qquad (4a)$$

The imaging optical system of the present disclosure satisfies condition (5) below:

$$|f\!f\!/f\!c| < 0.8 \qquad (5)$$

where, ff is a focal length of the focusing lens group moving along the optical axis during the focusing action, and fc is a focal length of the field curvature correction lens-group moving along the optical axis when an amount of the field curvature is changed.

Condition (5) prescribes the focal length of the field curvature correction lens-group with respect to the focal length of the focusing lens group. Satisfaction of condition (5) will invite this advantage: weakening influence of the field curvature correction lens-group to the focusing sensitivity. Excess over an upper limit of condition (5) will adversely invite stronger power of the field curvature correction lens-group, so that the focus becomes out of focus when the field curvature correction lens-group is moved.

Satisfaction of condition (5a) below more positively achieves the foregoing advantage.

$$|f\!f\!/f\!c| < 0.6 \qquad (5a)$$

First lens group G1 satisfies condition (6) below:

$$|f\!c/f1| < 0.3 \qquad (6)$$

where, f1 is a focal length of first lens group G1

Condition (6) prescribes the focal length of the field curvature correction lens-group with respect to the focal length of first lens group G1. Satisfaction of condition (6) will invite this advantage: reducing a change in the focus position with respect to an amount of movement of the field curvature correction lens-group, so that an out-of-focus can be prevented even if the field curvature correction lens-group moves for correcting the field curvature. Excess over an upper limit of condition (6) will invite an out-of-focus when the correction lens-group moves, so that the correction of the field curvature as well as an adjustment of focus becomes difficult.

Satisfaction of condition (6a) below more positively achieves the foregoing advantage.

$$|f\!c/f1| < 0.2 \qquad (6a)$$

The imaging optical system of the present disclosure satisfies condition (7) below:

$$3.0 < f1/f\!p < 15.0 \qquad (7)$$

where, f1 is a composite focal length at a wide angle end of a relay optical system located farther on the reduction side than the intermediate imaging position, and fp is a composite focal length at a wide angle end of a relay optical system located farther on the magnification side than the intermediate imaging position.

Condition (7) prescribes a magnifying optical system and the relay optical system. Satisfaction of condition (7) will invite this advantage: lowering various aberrations in the imaging optical system as well as downsizing the same system. Falling below a lower limit of condition (7) will invite a difficulty in generally parallelizing a chief ray and other rays given off from a surface of the image on the reduction side. Excess over an upper limit of condition (7) will adversely invite a difficulty in reducing effective diameters of the lenses located on the magnification side.

Satisfaction of condition (7a) below more positively achieves the foregoing advantage.

$$4.0 f1/f\!p < 12.0 \qquad (7a)$$

The imaging optical system of the present disclosure satisfies condition (8) below:

$$2.0 < |f4/f\!t| < 10.0 \qquad (8)$$

where, f4 is a focal length of the fourth lens group; and ft is a focal length of the total system at the telephoto end.

Condition (8) prescribes the power of fourth lens group G4. Satisfaction of condition (8) will invite this advantage: shortening the total length while the light given off from the image surface on the reduction side and deviated from the optical axis can be generally parallelized to the optical axis. Falling below a lower limit of condition (8) will make it impossible to parallelize a chief ray of the light deviated from the optical axis with the optical axis. Excess over an upper limit of condition (8) will invite a difficulty in shortening the total length.

Satisfaction of condition (8a) below more positively achieves the foregoing advantage.

$$3.0 < |f4/f\!t| < 6.5 \qquad (8a)$$

The imaging optical system of the present disclosure satisfies condition (9) below:

$$0.4 < f4/bf < 1.0 \qquad (9)$$

where, bf is a distance from a lens surface located furthest on the reduction side to an image surface on the reduction side.

Condition (9) prescribes a back focus. Satisfaction of condition (9) will invite this advantage: shortening the total length while the chief ray of the light deviated from the optical axis and given off from the image surface on the reduction side can be parallelized with the optical axis. Falling below a lower limit of condition (9) will lengthen the back focus, so that the shortening of the total length becomes difficult. Excess over an upper limit of condition (9) will make it impossible to parallelize the chief ray of the light, deviated from the optical axis and given off the image surface on the reduction side, with the optical axis.

Satisfaction of condition (9a) below more positively achieves the foregoing advantage.

$$0.55 < f4/bf < 0.8 \qquad (9a)$$

The imaging optical system of the present disclosure satisfies condition (10) below:

$$\Phi ht/\Phi_s < 0.9 \qquad (10)$$

where, $\Phi ht$ is an effective diameter of the lens having the following specifications:

Abbe number <30, and light absorption coefficient of the light having 400 nm wavelength<0.008, $\Phi_S$ is an aperture diameter of aperture stop.

Condition (10) prescribes the lenses of which effective diameters are smaller than an aperture diameter. Satisfaction of condition (10) will invite this advantage: preventing the lenses located near to an entrance pupil and having the smaller effective diameters from being affected by a temperature rise due to condensed light. Excess over an upper limit of condition (10) will invite a greater effective diameter of the lenses, and increase the cost thereof.

Satisfaction of condition (10a) below more positively achieves the foregoing advantage.

$$\Phi ht/\Phi_S < 0.6 \qquad (10a)$$

The imaging optical system of the present disclosure satisfies condition (11) below:

$$0.1 < |f\!ht/f\!w| < 100.0 \qquad (11)$$

where, fht is a focal length of a lens having a high transmittance.

Condition (11) prescribes a focal length of the lens having the following specification:

Abbe number<30, and light absorption coefficient of the light having 400 nm wavelength<0.08. Satisfaction of condition (11) will invite this advantage: correcting a chromatic aberration excellently. Falling below a lower limit of condition (11) will lower the correction effect of the chromatic aberration, and excess over an upper limit of condition (11) will invite frequent occurrences of the chromatic aberration.

Satisfaction of condition (11a) below more positively achieves the foregoing advantage.

$$0.8 < |fht/fw| < 50.0 \quad (11a)$$

As discussed above, the embodiment is demonstrated hereinbefore as an example of the techniques disclosed in the present patent application. Nevertheless, the techniques of the present disclosure are not limited to the foregoing example, but are applicable to other embodiments in which changes, replacements, additions, or omissions are carried out appropriately.

Embodiments 1-3 of the imaging optical system with numerical simulations are demonstrated hereinafter. In each one of the numerical simulations, a unit of length is expressed in mm (millimeter), a unit of angle of view is expressed in ° (degree). In each one of the numerical simulations, the following abbreviations are used:

r=curvature radius, d=face-to-face dimension,
   nd=refractive index with respect to d line, and
   vd=Abbe number with respect to d line.

In each one of the numerical simulations, the face marked with * is an aspherical face, and its shape is defined with the following equation (2).

$$Z = \frac{h^2/r}{1 + \sqrt{1 - (1+\kappa)(h/r)^2}} + \Sigma A_n h^n \quad \text{Equation (2)}$$

where, Z is a distance from a point on an aspherical face, located above the optical axis with a height h, to the tangent plane at the vertex of the aspherical face;

h is a height from the optical axis;

r is curvature radius at the vertex;

k a cone constant; and

An is a $n^{th}$ aspherical coefficient

First Embodiment with Numerical Simulation

A throw ratio of the imaging optical system in accordance with the first embodiment is 0.7 at the wide angle end and 0.9 at the telephoto end. The throw ratio is found by this formula: projecting distance/lateral size of an image projected on a screen, where the projecting distance measures from a lens surface located furthest on the magnification side (closest to the screen) of the imaging optical system to the screen along the projecting direction.

The image height used in the following data is set equal to or greater than 17.5 mm which is a diagonal dimension of the image forming element, because the design is drawn on the assumption that the optical axis of the imaging optical system can be shifted with respect to the image forming element.

Tables 1-10 show the lens data used in this first embodiment. Tables 2 and 3 list a series of surface data. The diameter of the aperture stop is 43.318 mm.

TABLE 1

|     | Lens glass material | Absorption coefficient @400 $\alpha = -(1/t)$ *ln(I/I0) | Effective diameter | Effective diameter/ Aperture diameter | Focal length of lens | Focal length of lens/ Focal length of wide angle end |
|-----|---------------------|---------------------------------------------------------|--------------------|---------------------------------------|----------------------|------------------------------------------------------|
| L1  | EFL6                | 0.0041                                                  | 106.496            | 2.46                                  | -92.02               | 4.19                                                 |
| L2  | TAF3                | 0.0030                                                  | 80.392             | 1.86                                  | 105.60               | 4.81                                                 |
| L3  | KPBK40              | 0.0009                                                  | 68.002             | 1.57                                  | -55.66               | 2.54                                                 |
| L4  | PBH56               | 0.0039                                                  | 46.430             | 1.07                                  | 303.34               | 13.82                                                |
| L5  | PBH56               | 0.0039                                                  | 22.078             | 0.51                                  | -31.56               | 1.44                                                 |
| L6  | TAC8                | 0.0015                                                  | 26.224             | 0.61                                  | 53.72                | 2.45                                                 |
| L7  | FCD100              | 0.0003                                                  | 34.094             | 0.79                                  | 61.15                | 2.78                                                 |
| L8  | FCD100              | 0.0003                                                  | 38.568             | 0.89                                  | 61.43                | 2.80                                                 |
| L9  | PBH56               | 0.0039                                                  | 41.198             | 0.96                                  | -59.58               | 2.71                                                 |
| L10 | FCD1                | 0.0005                                                  | 57.492             | 1.33                                  | 149.41               | 6.81                                                 |
| L11 | FDS90SG             | 0.0192                                                  | 63.794             | 1.47                                  | 87.88                | 4.00                                                 |
| L12 | FDS90SG             | 0.0192                                                  | 55.060             | 1.27                                  | 79.06                | 3.60                                                 |
| L13 | TAFD25              | 0.0158                                                  | 50.298             | 1.16                                  | -44.37               | 2.02                                                 |
| L14 | FDS90SG             | 0.0192                                                  | 45.098             | 1.04                                  | -47.29               | 2.15                                                 |
| L15 | FD140               | 0.0208                                                  | 55.768             | 1.29                                  | 253.23               | 11.53                                                |
| L16 | FDS90SG             | 0.0192                                                  | 68.456             | 1.58                                  | 81.94                | 3.73                                                 |
| L17 | FC5                 | 0.0002                                                  | 51.540             | 1.19                                  | 161.72               | 7.37                                                 |
| L18 | TAFD25              | 0.0158                                                  | 43.758             | 1.01                                  | -126.82              | 5.78                                                 |
| L19 | NBFD15              | 0.0090                                                  | 45.244             | 1.04                                  | -129.39              | 5.89                                                 |
| L20 | FCD100              | 0.0003                                                  | 48.940             | 1.13                                  | 86.39                | 3.93                                                 |
| L21 | FCD1                | 0.0005                                                  | 49.420             | 1.14                                  | 263.82               | 12.02                                                |
| L22 | FC5                 | 0.0002                                                  | 48.884             | 1.13                                  | 312.22               | 14.22                                                |
| L23 | NBF1                | 0.0016                                                  | 43.180             | 1.00                                  | -154.18              | 7.02                                                 |
| L24 | PBH56               | 0.0039                                                  | 44.224             | 1.02                                  | 50.58                | 2.30                                                 |
| L25 | BACD18              | 0.0013                                                  | 42.770             | 0.99                                  | -55.25               | 2.52                                                 |
| L26 | EFD2                | 0.0057                                                  | 61.660             | 1.42                                  | -42.19               | 1.92                                                 |
| L27 | FCD100              | 0.0003                                                  | 67.598             | 1.56                                  | 106.28               | 4.84                                                 |
| L28 | FCD100              | 0.0003                                                  | 79.724             | 1.84                                  | 146.59               | 6.68                                                 |

TABLE 1-continued

| | Lens glass material | Absorption coefficient @400 α = -(1/t) *ln(I/I0) | Effective diameter | Effective diameter/ Aperture diameter | Focal length of lens | Focal length of lens/ Focal length of wide angle end |
|---|---|---|---|---|---|---|
| L29 | FCD100 | 0.0003 | 83.052 | 1.92 | 192.94 | 8.79 |
| P | NBK7 | 0.0003 | 75.552 | 1.74 | ∞ | ∞ |

TABLE 2

Surface data

| Surface number | r | d | nd | vd | Effective radius |
|---|---|---|---|---|---|
| Object surface | ∞ | | | | |
| 1 | 1566.213 | 5 | 1.56732 | 42.8 | 53.248 |
| 2 | 50.4642 | 5.2599 | | | 40.3 |
| 3 | 60.3617 | 14.264 | 1.8042 | 46.5 | 40.196 |
| 4 | 186.7145 | 0.2 | | | 38.752 |
| 5 | 62.3334 | 4 | 1.5176 | 63.5 | 34.001 |
| 6* | 19.2718 | 18.3912 | | | 25.523 |
| 7 | 69.2944 | 21 | 1.84139 | 24.6 | 23.215 |
| 8 | 81.9474 | 12.4326 | | | 15.262 |
| 9 | -23.122 | 4.9867 | 1.84139 | 24.6 | 9.102 |
| 10 | -196.311 | 1.0239 | | | 11.039 |
| 11 | -79.0965 | 5.5792 | 1.72916 | 54.7 | 11.372 |
| 12 | -26.9757 | 0.2 | | | 13.112 |
| 13 | 91.423 | 8.6607 | 1.437 | 95.1 | 16.122 |
| 14 | -36.6678 | 3.5 | | | 17.047 |
| 15 | 120.8847 | 10.5867 | 1.437 | 95.1 | 18.994 |
| 16 | -33.5863 | 0.5438 | | | 19.284 |
| 17 | -33.2628 | 3 | 1.84139 | 24.6 | 19.188 |
| 18 | -102.948 | 22.0847 | | | 20.749 |
| 19 | 371.5186 | 8.6914 | 1.497 | 81.6 | 28.22 |
| 20 | -92.0884 | 18.705 | | | 28.746 |
| 21 | 67.6708 | 10.283 | 1.84666 | 23.8 | 31.897 |
| 22 | 695.7607 | 0.2 | | | 31.337 |
| 23 | 36.4317 | 10.6602 | 1.84666 | 23.8 | 27.53 |
| 24 | 69.2215 | 3.3563 | | | 25.605 |
| 25 | 155.025 | 9.9187 | 1.90366 | 31.3 | 25.149 |
| 26 | 30.8893 | 18.6872 | | | 18.885 |
| 27 | -37.3495 | 3 | 1.84666 | 23.8 | 19.735 |
| 28 | -576.499 | 10.649 | | | 22.549 |
| 29 | -43.0978 | 8.6626 | 1.76182 | 26.6 | 24.784 |
| 30 | -38.2896 | 3.3195 | | | 27.884 |
| 31 | -122.818 | 13.4628 | 1.84666 | 23.8 | 33.082 |
| 32 | -46.5597 | 12 | | | 34.228 |

TABLE 3

Surface data (continued)

| Surface number | r | d | nd | vd | Effective radius |
|---|---|---|---|---|---|
| Object surface | ∞ | | | | |
| 33 | ∞ | Variable | | | 30.253 |
| 34 | 144.3081 | 7.2259 | 1.48749 | 70.4 | 25.77 |
| 35 | -170.905 | Variable | | | 25.455 |
| 36 | -100.506 | 3 | 1.90366 | 31.3 | 21.424 |
| 37 | -828.752 | 1.8955 | | | 21.879 |
| 38 | 484.9338 | 3 | 1.8061 | 33.3 | 22.283 |
| 39 | 85.6041 | 0.2 | | | 22.622 |
| 40 | 81.097 | 19.643 | 1.437 | 95.1 | 22.779 |
| 41 | -65.4274 | 0.2 | | | 24.47 |
| 42 | 182.2892 | 5.3394 | 1.497 | 81.6 | 24.71 |
| 43 | -462.549 | 0.2 | | | 24.645 |
| 44 | 116.1663 | 4.999 | 1.48749 | 70.4 | 24.442 |
| 45 | 483.7295 | Variable | | | 24.112 |
| 46 (Aperture) | ∞ | 0.7496 | | | 21.659 |
| 47 | -933.889 | 3 | 1.7433 | 49.2 | 21.59 |
| 48 | 130.809 | 21.5887 | | | 21.245 |
| 49 | 70.684 | 8.9114 | 1.84139 | 24.6 | 22.112 |
| 50 | -100.786 | 0.2 | | | 21.791 |
| 51 | -138.501 | 3 | 1.63854 | 55.4 | 21.385 |

TABLE 3-continued

Surface data (continued)

| Surface number | r | d | nd | vd | Effective radius |
|---|---|---|---|---|---|
| 52 | 47.7388 | 12.0688 | | | 19.89 |
| 53 | -35.9132 | 21 | 1.64769 | 33.8 | 20.138 |
| 54 | 140.5798 | 0.8751 | | | 30.83 |
| 55 | 163.1947 | 17.9493 | 1.437 | 95.1 | 31.389 |
| 56 | -62.7453 | 0.2 | | | 33.799 |
| 57 | 265.2442 | 16.1256 | 1.437 | 95.1 | 39.196 |
| 58 | -82.8947 | 0.2 | | | 39.862 |
| 59 | 107.2858 | 13.6246 | 1.437 | 95.1 | 41.526 |
| 60 | -378.576 | 22 | | | 41.326 |
| 61 | ∞ | 153.8 | 1.5168 | 64.2 | 37.776 |
| 62 | ∞ | 3 | | | 23.048 |
| Image surface | ∞ | | | | |

TABLE 4

Aspheric data
Sixth surface

| K | -9.80E-01 |
|---|---|
| A4 | 3.86E-06 |
| A6 | -5.26E-10 |
| A8 | -1.89E-12 |
| A10 | -3.41E-15 |

TABLE 5

Various data when the projecting distance is infinity
Zoom ratio: 1.28091

| | Wide angle | Intermediate | Telephoto |
|---|---|---|---|
| Focal length | -21.956 | -24.7178 | -28.1237 |
| F-number | -2.50403 | -2.50346 | -2.50738 |
| Angle of view | -45.8706 | -42.4981 | -38.8464 |
| Image height | 22.6 | 22.6 | 22.6 |
| d33 | 79.6946 | 64.1547 | 47.8148 |
| d35 | 2 | 10.6202 | 17.6792 |
| d45 | 2 | 8.9196 | 18.2005 |

TABLE 6

Zoom lens groups' data

| Groups | Start surface | Focal length |
|---|---|---|
| 1 | 1 | 49.16019 |
| 2 | 34 | 161.7153 |
| 3 | 36 | 170.849 |
| 4 | 46 | 111.0949 |

TABLE 7

Various data at projection size of 200 inches (145.1 times)
Zoom ratio: 1.28078

|  | Wide angle | Intermediate | Telephoto |
|---|---|---|---|
| Focal length | −21.9822 | −24.7327 | −28.1545 |
| F-number | −2.5039 | −2.50364 | −2.50718 |
| Angle of view | −45.8361 | −42.4934 | −38.8176 |
| Image height | 22.6 | 22.6 | 22.6 |
| d0 | 3151.354 | 3550.512 | 4046.908 |
| d14 | 3.211 | 3.034 | 3.2411 |
| d18 | 22.3737 | 22.5507 | 22.3436 |
| d30 | 3.4543 | 3.3805 | 3.424 |
| d33 | 79.5598 | 64.0937 | 47.7103 |
| d35 | 2 | 10.6202 | 17.6792 |
| d45 | 2 | 8.9196 | 18.2005 |

TABLE 8

Zoom lens groups' data

| Groups | Start surface | Focal length |
|---|---|---|
| 1 | 1 | 96.36227 |
| 2 | 15 | −7888.86 |
| 3 | 19 | 52.9806 |
| 4 | 31 | 81.9355 |
| 5 | 34 | 161.7153 |
| 6 | 36 | 170.849 |
| 7 | 46 | 111.0949 |

TABLE 9

Various data at projection size of 70 inches (50.8 times)
Zoom ratio: 1.28057

|  | Wide angle | Intermediate | Telephoto |
|---|---|---|---|
| Focal length | −22.0305 | −24.7842 | −28.2116 |
| F-number | −2.50364 | −2.50337 | −2.50681 |

TABLE 9-continued

Various data at projection size of 70 inches (50.8 times)
Zoom ratio: 1.28057

|  | Wide angle | Intermediate | Telephoto |
|---|---|---|---|
| Angle of view | −45.7727 | −42.4368 | −38.7637 |
| Image height | 22.6 | 22.6 | 22.6 |
| d0 | 1079.914 | 1219.598 | 1393.301 |
| d14 | 2.6681 | 2.5284 | 2.7802 |
| d18 | 22.9166 | 23.0563 | 22.8045 |
| d30 | 3.7029 | 3.6023 | 3.6185 |
| d33 | 79.3112 | 63.8719 | 47.5158 |
| d35 | 2 | 10.6202 | 17.6792 |
| d45 | 2 | 8.9196 | 18.2005 |

TABLE 10

Zoom lens groups' data

| Groups | Start surface | Focal length |
|---|---|---|
| 1 | 1 | 96.36227 |
| 2 | 15 | −7888.86 |
| 3 | 19 | 52.9806 |
| 4 | 31 | 81.9355 |
| 5 | 34 | 161.7153 |
| 6 | 36 | 170.849 |
| 7 | 46 | 111.0949 |

Second Embodiment with Numerical Simulation

The throw ratio of the imaging optical system used in the second embodiment is 0.5 at the wide angle end, and 0.6 at the telephoto end.

Tables 11-20 show the lens data used in this second embodiment. Tables 12 and 13 list a series of surface data. The diameter of the aperture stop is 45.444 mm.

TABLE 11

|  | Lens glass material | Absorption coefficient @400 $\alpha = -(1/t) * \ln(I/I0)$ | Effective diameter | Effective diameter/ Aperture diameter | Focal length of lens | Focal length of lens/ Focal length of wide angle end |
|---|---|---|---|---|---|---|
| L1 | TAF3 | 0.0030 | 130.000 | 2.86 | −150.25 | 9.52 |
| L2 | TAFD55 | 0.0289 | 99.500 | 2.19 | 347.57 | 22.03 |
| L3 | LBAL42 | 0.0005 | 68.000 | 1.50 | −39.67 | 2.51 |
| L4 | PBH56 | 0.0039 | 41.606 | 0.92 | 163.65 | 10.37 |
| L5 | PBH56 | 0.0039 | 20.700 | 0.46 | −28.25 | 1.79 |
| L6 | TAC8 | 0.0015 | 24.110 | 0.53 | 52.68 | 3.34 |
| L7 | FCD100 | 0.0003 | 29.748 | 0.65 | 52.20 | 3.31 |
| L8 | FCD100 | 0.0003 | 35.630 | 0.78 | 51.53 | 3.27 |
| L9 | PBH56 | 0.0039 | 36.422 | 0.80 | −39.74 | 2.52 |
| L10 | FCD1 | 0.0005 | 43.638 | 0.96 | 123.59 | 7.83 |
| L11 | FDS90SG | 0.0192 | 50.958 | 1.12 | 90.09 | 5.71 |
| L12 | FDS90SG | 0.0192 | 48.080 | 1.06 | 48.55 | 3.08 |
| L13 | NBFD13 | 0.0066 | 42.934 | 0.94 | −41.48 | 2.63 |
| L14 | FDS90SG | 0.0192 | 44.714 | 0.98 | −43.30 | 2.74 |
| L15 | TAFD35 | 0.0129 | 55.002 | 1.21 | 98.88 | 6.27 |
| L16 | EFD10 | 0.0159 | 66.944 | 1.47 | 108.62 | 6.88 |
| L17 | FC5 | 0.0002 | 51.674 | 1.14 | 171.53 | 10.87 |
| L18 | TAFD35 | 0.0129 | 50.432 | 1.11 | −105.06 | 6.66 |
| L19 | TAF1 | 0.0017 | 51.232 | 1.13 | −159.74 | 10.12 |
| L20 | FCD100 | 0.0003 | 51.670 | 1.14 | 78.08 | 4.95 |
| L21 | FCD1 | 0.0005 | 50.334 | 1.11 | 324.81 | 20.59 |
| L22 | FC5 | 0.0002 | 49.754 | 1.09 | 553.98 | 35.11 |
| L23 | NBF1 | 0.0016 | 46.598 | 1.03 | −257.64 | 16.33 |
| L24 | PBH56 | 0.0039 | 44.904 | 0.99 | 52.45 | 3.32 |
| L25 | BACED5 | 0.0021 | 43.078 | 0.95 | −53.36 | 3.38 |

TABLE 11-continued

| | Lens glass material | Absorption coefficient @400 α = −(1/t) *ln(I/I0) | Effective diameter | Effective diameter/ Aperture diameter | Focal length of lens | Focal length of lens/ Focal length of wide angle end |
|---|---|---|---|---|---|---|
| L26 | EFD2 | 0.0057 | 58.248 | 1.28 | −40.61 | 2.57 |
| L27 | FCD100 | 0.0003 | 65.168 | 1.43 | 104.04 | 6.59 |
| L28 | FCD100 | 0.0003 | 77.274 | 1.70 | 134.21 | 8.51 |
| L29 | FCD100 | 0.0003 | 81.102 | 1.78 | 182.17 | 11.54 |
| P | NBK7 | 0.0003 | 73.952 | 1.63 | ∞ | ∞ |

TABLE 12

Surface data

| Surface number | r | d | nd | vd | Effective radius |
|---|---|---|---|---|---|
| Object surface | ∞ | | | | |
| 1 | 118.3107 | 6 | 1.8042 | 46.5 | 65 |
| 2 | 58.4276 | 10.8776 | | | 50.078 |
| 3 | 77.9176 | 26.5758 | 2.001 | 29.1 | 49.75 |
| 4 | 83.2721 | 0.2 | | | 36.969 |
| 5 | 57.1273 | 4 | 1.58313 | 59.4 | 34 |
| 6* | 16.0409 | 21.0418 | | | 23.42 |
| 7 | 194.9286 | 28 | 1.84139 | 24.6 | 20.803 |
| 8 | −438.146 | 2.2008 | | | 10.244 |
| 9 | −27.1956 | 12.3593 | 1.84139 | 24.6 | 9.732 |
| 10 | 227.7262 | 1.1456 | | | 10.35 |
| 11 | −109.596 | 4.8425 | 1.72916 | 54.7 | 9.827 |
| 12 | −28.9728 | 0.2 | | | 12.055 |
| 13 | 53.8677 | 10.6735 | 1.437 | 95.1 | 14.788 |
| 14 | −37.1852 | 3.5 | | | 14.874 |
| 15 | 79.9752 | 9.8193 | 1.437 | 95.1 | 17.715 |
| 16 | −30.1758 | 0.6027 | | | 17.815 |
| 17 | −29.464 | 3 | 1.84139 | 24.6 | 17.659 |
| 18 | −259.411 | 4.0739 | | | 18.211 |
| 19 | 749.8122 | 6.6666 | 1.497 | 81.6 | 21.233 |
| 20 | −66.7077 | 17.5544 | | | 21.819 |
| 21 | 152.7199 | 7.2323 | 1.84666 | 23.8 | 25.466 |
| 22 | −149.065 | 0.2 | | | 25.479 |
| 23 | 33.7104 | 11.4596 | 1.84666 | 23.8 | 24.04 |
| 24 | 158.1885 | 3.0257 | | | 22.63 |
| 25 | −4504.14 | 4.5988 | 1.8061 | 40.7 | 21.467 |
| 26 | 33.7038 | 20.7922 | | | 17.749 |
| 27 | −34.3854 | 3 | 1.84666 | 23.8 | 19.188 |
| 28 | −576.499 | 9.7401 | | | 22.357 |
| 29 | −54.6338 | 9.2866 | 1.91082 | 35.2 | 25.416 |
| 30 | −36.7612 | 5.9771 | | | 27.501 |
| 31 | −89.2723 | 14.3951 | 1.72825 | 28.3 | 31.666 |
| 32 | −44.789 | 12 | | | 33.472 |

TABLE 13

Surface data (continued)

| Surface number | r | d | nd | vd | Effective radius |
|---|---|---|---|---|---|
| Object surface | ∞ | | | | |
| 33 | ∞ | Variable | | | 29.135 |
| 34 | 206.6891 | 6.145 | 1.48749 | 70.4 | 22.871 |
| 35 | −139.063 | Variable | | | 25.837 |
| 36 | −71.7241 | 3 | 1.91082 | 35.2 | 21.769 |
| 37 | −292.053 | 6.7329 | | | 25.216 |
| 38 | 208.8528 | 3 | 1.7725 | 49.6 | 24.222 |
| 39 | 77.0832 | 0.2 | | | 25.616 |
| 40 | 74.2605 | 12.7526 | 1.437 | 95.1 | 25.721 |
| 41 | −59.8229 | 0.2 | | | 25.835 |
| 42 | 189.2688 | 4.9689 | 1.497 | 81.6 | 25.167 |
| 43 | −1088.05 | 0.2 | | | 25.046 |
| 44 | 166.1841 | 4.1667 | 1.48749 | 70.4 | 24.877 |
| 45 | 428.5025 | Variable | | | 24.584 |
| 46 (Aperture) | ∞ | 0.6779 | | | 22.722 |
| 47 | −1443.38 | 3 | 1.7433 | 49.2 | 23.299 |
| 48 | 220.9991 | 29.6526 | | | 22.405 |

TABLE 13-continued

Surface data (continued)

| Surface number | r | d | nd | vd | Effective radius |
|---|---|---|---|---|---|
| 49 | 76.8369 | 8.3363 | 1.84139 | 24.6 | 22.452 |
| 50 | −98.5493 | 0.2 | | | 22.114 |
| 51 | −143.016 | 3 | 1.65844 | 50.9 | 21.539 |
| 52 | 46.9613 | 11.3479 | | | 18.989 |
| 53 | −34.3436 | 19.1043 | 1.64769 | 33.8 | 20.385 |
| 54 | 136.908 | 0.8345 | | | 29.124 |
| 55 | 158.7202 | 14.1737 | 1.437 | 95.1 | 31.712 |
| 56 | −61.99 | 0.2 | | | 32.584 |
| 57 | 258.816 | 15.1777 | 1.437 | 95.1 | 38.257 |
| 58 | −74.4845 | 0.2 | | | 38.637 |
| 59 | 112.9 | 12.5797 | 1.437 | 95.1 | 40.551 |
| 60 | −260.816 | 22 | | | 40.463 |
| 61 | ∞ | 153.8 | 1.5168 | 64.2 | 36.976 |
| 62 | ∞ | 3 | | | 23.014 |
| Image surface | ∞ | | | | |

TABLE 14

Aspheric data
Sixth surface

| K | −7.11E−01 |
|---|---|
| A4 | −1.00E−06 |
| A6 | −5.25E−09 |
| A8 | 2.48E−12 |
| A10 | −3.33E−14 |

TABLE 15

Various data when the projecting distance is infinity
Zoom ratio: 1.19381

| | Wide angle | Intermediate | Telephoto |
|---|---|---|---|
| Focal length | −15.7791 | −17.1001 | −18.8374 |
| F-number | −2.5032 | −2.50293 | −2.50544 |
| Angle of view | −54.9671 | −52.8069 | −50.1085 |
| Image height | 22.6 | 22.6 | 22.6 |
| d33 | 82.3079 | 71.207 | 58.2442 |
| d35 | 2 | 7.0208 | 11.5349 |
| d45 | 2 | 8.08 | 16.5286 |

TABLE 16

Zoom lens groups' data

| Groups | Start surface | Focal length |
|---|---|---|
| 1 | 1 | 37.09378 |
| 2 | 34 | 171.52818 |
| 3 | 36 | 225.39504 |
| 4 | 46 | 115.74054 |

TABLE 17

Various data at projection size of 200 inches (145.1 times)
Zoom ratio: 1.19383

|  | Wide angle | Intermediate | Telephoto |
|---|---|---|---|
| Focal length | −15.782 | −17.0983 | −18.841 |
| F-number | −2.50301 | −2.50288 | −2.50513 |
| Angle of view | −55.0287 | −52.8726 | −50.1466 |
| Image height | 22.6 | 22.6 | 22.6 |
| d0 | 2241.422 | 2432.517 | 2685.48 |
| d14 | 3.1581 | 3.124 | 3.2117 |
| d18 | 4.4157 | 4.4498 | 4.3621 |
| d30 | 6.157 | 6.1005 | 6.1249 |
| d33 | 82.128 | 71.0835 | 58.0964 |
| d35 | 2 | 7.0208 | 11.5349 |
| d45 | 2 | 8.08 | 16.5286 |

TABLE 18

Zoom lens groups' data

| Groups | Start surface | Focal length |
|---|---|---|
| 1 | 1 | 39.98678 |
| 2 | 15 | −216.188 |
| 3 | 19 | 48.74835 |
| 4 | 31 | 108.6161 |
| 5 | 34 | 171.5282 |
| 6 | 36 | 225.395 |
| 7 | 46 | 115.7405 |

TABLE 19

Various data at projection size of 70 inches (50.8 times)
Zoom ratio: 1.19392

|  | Wide angle | Intermediate | Telephoto |
|---|---|---|---|
| Focal length | −15.7865 | −17.1036 | −18.8478 |
| F-number | −2.50268 | −2.50251 | −2.5046 |
| Angle of view | −55.1443 | −52.9658 | −50.216 |
| Image height | 22.6 | 22.6 | 22.6 |
| d0 | 752.5299 | 819.3999 | 907.9235 |
| d14 | 2.5291 | 2.5419 | 2.6795 |
| d18 | 5.0448 | 5.0319 | 4.8943 |
| d30 | 6.4822 | 6.4041 | 6.4019 |
| d33 | 81.8027 | 70.78 | 57.8195 |
| d35 | 2 | 7.0208 | 11.5349 |
| d45 | 2 | 8.08 | 16.5286 |

TABLE 20

Zoom lens groups' data

| Groups | Start surface | Focal length |
|---|---|---|
| 1 | 1 | 39.98678 |
| 2 | 15 | −216.188 |
| 3 | 19 | 48.74835 |
| 4 | 31 | 108.6161 |
| 5 | 34 | 171.5282 |
| 6 | 36 | 225.395 |
| 7 | 46 | 115.7405 |

Third Embodiment with Numerical Simulation

The throw ratio of the imaging optical system used in this third embodiment is 0.9 at the wide angle end, and 1.1 at the telephoto end.

Tables 21-30 show the lens data used in this third embodiment. Tables 22 and 23 list a series of surface data. The diameter of the aperture stop is 43.570 mm.

TABLE 21

|  | Lens glass material | Absorption coefficient @400 $\alpha = -(1/t) \cdot \ln(I/I0)$ | Effective diameter | Effective diameter/ Aperture diameter | Focal length of lens | Focal length of lens/ Focal length of wide angle end |
|---|---|---|---|---|---|---|
| L1 | EF5 | 0.0044 | 84.806 | 1.95 | −70.15 | 2.50 |
| L2 | TAF3 | 0.0030 | 67.924 | 1.56 | 73.09 | 2.60 |
| L3 | KPMK30 | 0.0005 | 57.828 | 1.33 | −59.86 | 2.13 |
| L4 | PBH56 | 0.0039 | 38.668 | 0.89 | 240.97 | 8.58 |
| L5 | PBH56 | 0.0039 | 23.060 | 0.53 | −32.59 | 1.16 |
| L6 | LAC14 | 0.0011 | 27.124 | 0.62 | 57.97 | 2.06 |
| L7 | FCD100 | 0.0003 | 34.650 | 0.80 | 68.08 | 2.42 |
| L8 | FCD100 | 0.0003 | 39.888 | 0.92 | 64.10 | 2.28 |
| L9 | PBH56 | 0.0039 | 43.010 | 0.99 | −73.84 | 2.63 |
| L10 | FCD1 | 0.0005 | 60.544 | 1.39 | 158.64 | 5.65 |
| L11 | FDS90SG | 0.0192 | 65.088 | 1.49 | 95.28 | 3.39 |
| L12 | PBH56 | 0.0039 | 56.170 | 1.29 | 106.44 | 3.79 |
| L13 | NBFD15W | 0.0059 | 50.034 | 1.15 | −57.25 | 2.04 |
| L14 | PBH56 | 0.0039 | 43.172 | 0.99 | −47.44 | 1.69 |
| L15 | PBH56 | 0.0039 | 53.488 | 1.23 | 423.30 | 15.06 |
| L16 | FDS90SG | 0.0192 | 64.284 | 1.48 | 76.01 | 2.71 |
| L17 | FC5 | 0.0002 | 51.956 | 1.19 | 163.14 | 5.81 |
| L18 | NBFD15W | 0.0059 | 45.428 | 1.04 | −182.96 | 6.51 |
| L19 | NBFD15W | 0.0059 | 46.192 | 1.06 | −103.90 | 3.70 |
| L20 | FCD100 | 0.0003 | 48.506 | 1.11 | 86.05 | 3.06 |
| L21 | FCD1 | 0.0005 | 48.964 | 1.12 | 231.21 | 8.23 |
| L22 | FC5 | 0.0002 | 48.242 | 1.11 | 360.25 | 12.82 |
| L23 | NBF1 | 0.0016 | 43.430 | 1.00 | −152.24 | 5.42 |
| L24 | PBH56 | 0.0039 | 45.022 | 1.03 | 55.18 | 1.96 |

TABLE 21-continued

| | Lens glass material | Absorption coefficient @400 α = −(1/t) *ln(I/I0) | Effective diameter | Effective diameter/ Aperture diameter | Focal length of lens | Focal length of lens/ Focal length of wide angle end |
|---|---|---|---|---|---|---|
| L25 | BACD18 | 0.0013 | 43.494 | 1.00 | −59.96 | 2.13 |
| L26 | EF2 | 0.0049 | 62.506 | 1.43 | −44.34 | 1.58 |
| L27 | FCD100 | 0.0003 | 66.422 | 1.52 | 105.00 | 3.74 |
| L28 | FCD100 | 0.0003 | 77.970 | 1.79 | 146.13 | 5.20 |
| L29 | FCD100 | 0.0003 | 81.078 | 1.86 | 194.35 | 6.92 |
| P | NBK7 | 0.0003 | 73.994 | 1.70 | ∞ | ∞ |

TABLE 22

Surface data

| Surface number | r | d | nd | vd | Effective radius |
|---|---|---|---|---|---|
| Object surface | ∞ | | | | |
| 1 | −656.064 | 5 | 1.60342 | 38 | 42.403 |
| 2 | 45.3758 | 3.068 | | | 34.002 |
| 3 | 46.5425 | 14.9135 | 1.8042 | 46.5 | 33.962 |
| 4 | 191.6049 | 0.2 | | | 32.662 |
| 5 | 56.5377 | 4 | 1.525 | 70.3 | 28.914 |
| 6* | 19.7064 | 17.2085 | | | 22.414 |
| 7 | 49.4787 | 21 | 1.84139 | 24.6 | 19.334 |
| 8 | 52.7584 | 10.6396 | | | 11.929 |
| 9 | −22.4814 | 5.0988 | 1.84139 | 24.6 | 9.521 |
| 10 | −137.693 | 0.888 | | | 11.53 |
| 11 | −82.5889 | 5.6684 | 1.6968 | 55.5 | 11.82 |
| 12 | −27.8923 | 0.2 | | | 13.562 |
| 13 | 149.0052 | 8.2639 | 1.437 | 95.1 | 16.319 |
| 14 | −36.5439 | 3.5 | | | 17.325 |
| 15 | 154.0886 | 10.8279 | 1.437 | 95.1 | 19.552 |
| 16 | −33.5046 | 0.2 | | | 19.944 |
| 17 | −33.8276 | 3 | 1.84139 | 24.6 | 19.901 |
| 18 | −77.2754 | 27.5048 | | | 21.505 |
| 19 | 861.9723 | 8.9991 | 1.497 | 81.6 | 29.78 |
| 20 | −86.4796 | 22.7441 | | | 30.272 |
| 21 | 67.6685 | 10.0365 | 1.84666 | 23.8 | 32.544 |
| 22 | 391.3697 | 0.2 | | | 31.909 |
| 23 | 37.4432 | 10.7465 | 1.84139 | 24.6 | 28.085 |
| 24 | 55.9061 | 4.1055 | | | 25.402 |
| 25 | 126.4832 | 9.5909 | 1.8061 | 33.3 | 25.017 |
| 26 | 32.6671 | 21.0051 | | | 18.789 |
| 27 | −37.2255 | 3.6662 | 1.84139 | 24.6 | 19.101 |
| 28 | −576.499 | 10.8649 | | | 21.586 |
| 29 | −36.6964 | 8.4869 | 1.84139 | 24.6 | 23.23 |
| 30 | −36.7843 | 1.2184 | | | 26.744 |
| 31 | −203.449 | 12.3712 | 1.84666 | 23.8 | 31.221 |
| 32 | −50.2529 | 12 | | | 32.142 |

TABLE 23

Surface data (continued)

| Surface number | r | d | nd | vd | Effective radius |
|---|---|---|---|---|---|
| Object surface | ∞ | | | | |
| 33 | ∞ | Variable | | | 29.802 |
| 34 | 148.5076 | 7.2569 | 1.48749 | 70.4 | 25.978 |
| 35 | −168.485 | Variable | | | 25.671 |
| 36 | −94.9147 | 3 | 1.8061 | 33.3 | 22.523 |
| 37 | −270.052 | 0.7616 | | | 22.714 |
| 38 | −2984.09 | 3 | 1.8061 | 33.3 | 22.736 |
| 39 | 86.2081 | 0.2 | | | 23.096 |
| 40 | 81.2666 | 15.0258 | 1.437 | 95.1 | 23.262 |
| 41 | −66.0493 | 0.2 | | | 24.253 |
| 42 | 154.4512 | 5.6237 | 1.497 | 81.6 | 24.482 |
| 43 | −443.437 | 0.2 | | | 24.389 |
| 44 | 107.0246 | 4.7075 | 1.48749 | 70.4 | 24.121 |
| 45 | 270.0648 | Variable | | | 23.745 |
| 46 (Aperture) | ∞ | 1.1545 | | | 21.785 |
| 47 | −360.513 | 3 | 1.7433 | 49.2 | 21.715 |

TABLE 23-continued

Surface data (continued)

| Surface number | r | d | nd | vd | Effective radius |
|---|---|---|---|---|---|
| 48 | 165.5117 | 25.7366 | | | 21.436 |
| 49 | 86.5679 | 8.4491 | 1.84139 | 24.6 | 22.511 |
| 50 | −95.6709 | 0.2 | | | 22.258 |
| 51 | −146.607 | 3 | 1.63854 | 55.4 | 21.747 |
| 52 | 52.233 | 11.976 | | | 20.344 |
| 53 | −35.9824 | 20.0137 | 1.62004 | 36.3 | 20.578 |
| 54 | 141.3419 | 0.8106 | | | 31.253 |
| 55 | 160.2086 | 15.7633 | 1.437 | 95.1 | 31.801 |
| 56 | −62.38 | 0.2 | | | 33.211 |
| 57 | 258.7058 | 15.5491 | 1.437 | 95.1 | 38.335 |
| 58 | −83.2405 | 0.2 | | | 38.985 |
| 59 | 108.6175 | 13.0242 | 1.437 | 95.1 | 40.539 |
| 60 | −375.244 | 22 | | | 40.352 |
| 61 | ∞ | 153.8 | 1.5168 | 64.2 | 36.997 |
| 62 | ∞ | 3 | | | 23.022 |
| Image surface | ∞ | | | | |

TABLE 24

Aspheric data
Sixth surface

| K | −9.73E−01 |
|---|---|
| A4 | 3.64E−06 |
| A6 | −2.38E−11 |
| A8 | −5.60E−14 |
| A10 | −4.24E−16 |

TABLE 25

Various data when the projecting distance is infinity
Zoom ratio: 1.21915

| | Wide angle | Intermediate | Telephoto |
|---|---|---|---|
| Focal length | −28.0988 | −30.8792 | −34.2567 |
| F-number | −2.50496 | −2.50462 | −2.50739 |
| Angle of view | −38.8107 | −36.1987 | −33.4064 |
| Image height | 22.6 | 22.6 | 22.6002 |
| d33 | 80.9308 | 68.9152 | 56.1205 |
| d35 | 2 | 8.4566 | 14.0857 |
| d45 | 2 | 7.5589 | 14.7246 |

TABLE 26

Zoom lens groups' data

| Groups | Start surface | Focal length |
|---|---|---|
| 1 | 1 | 59.1423 |
| 2 | 34 | 163.14226 |

TABLE 26-continued

Zoom lens groups' data

| Groups | Start surface | Focal length |
|---|---|---|
| 3 | 36 | 173.85502 |
| 4 | 46 | 111.97088 |

TABLE 27

Various data at projection size of 200 inches (145.1 times)
Zoom ratio: 1.21905

| | Wide angle | Intermediate | Telephoto |
|---|---|---|---|
| Focal length | −28.1488 | −30.9255 | −34.3149 |
| F-number | −2.50484 | −2.50474 | −2.50722 |
| Angle of view | −38.7572 | −36.161 | −33.3605 |
| Image height | 22.6 | 22.6 | 22.6 |
| Lens total length | 700.0066 | 700.0234 | 700.0451 |
| BF | 0.00648 | 0.02346 | 0.04499 |
| d0 | 4047.138 | 4450.061 | 4941.676 |
| d14 | 3.2421 | 3.089 | 3.1792 |
| d18 | 27.7626 | 27.9157 | 27.8256 |
| d30 | 1.3566 | 1.3029 | 1.3263 |
| d33 | 80.7927 | 68.8307 | 56.0126 |
| d35 | 2 | 8.4566 | 14.0857 |
| d45 | 2 | 7.5589 | 14.7246 |

TABLE 28

Zoom lens groups' data

| Groups | Start surface | Focal length |
|---|---|---|
| 1 | 1 | 219.2082 |
| 2 | 15 | 473.5286 |
| 3 | 19 | 58.45259 |
| 4 | 31 | 76.00969 |
| 5 | 34 | 163.1423 |
| 6 | 36 | 173.855 |
| 7 | 46 | 111.9709 |

TABLE 29

Various data at projection size of 70 inches (50.8 times)
Zoom ratio: 1.21868

| | Wide angle | Intermediate | Telephoto |
|---|---|---|---|
| Focal length | −28.2429 | −31.0236 | −34.4191 |
| F-number | −2.50465 | −2.50456 | −2.50699 |
| Angle of view | −38.6563 | −36.0711 | −33.2792 |
| Image height | 22.6 | 22.6 | 22.6 |
| d0 | 1396.298 | 1537.34 | 1709.39 |
| d14 | 2.6895 | 2.5629 | 2.6905 |
| d18 | 28.3152 | 28.4418 | 28.3142 |
| d30 | 1.6072 | 1.5305 | 1.5308 |
| d33 | 80.5421 | 68.6031 | 55.8081 |
| d35 | 2 | 8.4566 | 14.0857 |
| d45 | 2 | 7.5589 | 14.7246 |

TABLE 30

Zoom lens groups' data

| Groups | Start surface | Focal length |
|---|---|---|
| 1 | 1 | 219.2082 |
| 2 | 15 | 473.5286 |

TABLE 30-continued

Zoom lens groups' data

| Groups | Start surface | Focal length |
|---|---|---|
| 3 | 19 | 58.45259 |
| 4 | 31 | 76.00969 |
| 5 | 34 | 163.1423 |
| 6 | 36 | 173.855 |
| 7 | 46 | 111.9709 |

Table 31 below shows numerical data obtained when each of the conditions (1)-(11) are applied to the lens systems used in the foregoing embodiments. Nevertheless, the numerical data in the rows of conditions (10) and (11) show only the case where the lens having the smallest effective diameter is used. Referring to tables 1-30 will show the lenses having other effective diameters.

TABLE 31

| | Embodiment 1 | Embodiment 2 | Embodiment 3 |
|---|---|---|---|
| Condition (1) | 2.6 | 2.89 | 2.61 |
| Condition (2) | 0.24 | 0.69 | 0.11 |
| Condition (3) | 1.07 | 2.95 | 0.87 |
| Condition (4) | 0 | 0.13 | 0.03 |
| Condition (5) | 0.01 | 0.5 | 0.16 |
| Condition (6) | 0.01 | 0.17 | 0.12 |
| Condition (7) | 6.19 | 11.06 | 4.94 |
| Condition (8) | 3.95 | 6.14 | 3.27 |
| Condition (9) | 0.62 | 0.65 | 0.63 |
| Condition (10) | 0.51 | 0.46 | 0.53 |
| Condition (11) | 1.44 | 1.79 | 1.16 |

INDUSTRIAL APPLICABILITY

The present disclosure is applicable to image projection apparatus (e.g. projector), and cameras including such as a digital still camera, digital video camera, surveillance camera used in a surveillance system, Web camera, or on-vehicle camera. The present disclosure, in particular, is best-fit for an imaging optical system including such as a projector, digital still camera system, and digital video camera system, viz. the systems requiring quality images.

What is claimed is:

1. An optical system comprising a plurality of lens groups, the plurality of lens groups each including at least one lens and moving such that spaces between each one of the plurality of lens groups change during a zooming action,
    wherein the optical system conjugates a conjugate point on a magnification side of the optical system and an intermediate imaging position inside the imaging optical system, and conjugates a conjugate point on a reduction side of the optical system and the intermediate imaging position,
    wherein the optical system includes in order from the magnification side toward the reduction side, a first lens group located at a furthest place on the magnification side and a rear group,
    wherein the first lens group includes a field curvature correction lens group including at least one lens element and moving along an optical axis to change an amount of a field curvature of the optical system, and a focusing lens group including at least one lens element and moving along the optical axis during a focusing action from an infinity focus state to closest focus state, wherein the optical system satisfies condition (4) below:

$$|\{(1-\beta cw^2)\times\beta crw^2\}/\{(1-\beta fw^2)\times\beta frw^2\}|<0.2 \quad (4)$$

where,

βcw is a paraxial lateral magnification, at a wide angle end, of the field curvature correction lens group moving along the optical axis to change the amount of the field curvature, βcrw is a paraxial lateral magnification, at the wide angle end, of every lens located farther on the reduction side than the field curvature correction lens group moving along the optical axis to change the amount of the field curvature, βfw is a paraxial lateral magnification, at the wide angle end, of the focusing lens group moving along the optical axis during the focusing action, and βfrw is a paraxial lateral magnification, at the wide angle end, of every lens located farther on the reduction side than the focusing lens group moving along the optical axis during the focusing action.

2. The optical system according to claim 1, wherein the optical system satisfies condition (5) below:

$$|ff/fc|<0.8 \quad (5)$$

where, ff is a focal length of the focusing lens group moving along the optical axis during the focusing action, and fc is a focal length of the field curvature correction lens group moving along the optical axis to change the amount of the field curvature.

3. The optical system according to claim 1, wherein the field curvature correction lens group includes one negative lens and one positive lens.

4. The optical system according to claim 1, wherein the optical system satisfies condition (6) below:

$$|fc/f1|<0.3 \quad (6)$$

where, f1 is a focal length of the first lens group, and fc is a focal length of the field curvature correction lens group moving along the optical axis to change the amount of the field curvature.

5. The optical system according to claim 1, wherein the first lens group includes an aspherical lens, and includes a first front-side sub-lens group and a first rear-side sub-lens group, the first front-side sub-lens group including an aspherical lens located furthest on the magnification side among other aspherical lenses and a lens located farther on the magnification side than the aspherical lens located furthest on the magnification side among other aspherical lenses, the first rear-side sub-lens group located farther on the reduction side than the aspherical lens located furthest on the magnification side among the other aspherical lenses, and wherein the first front-side sub-lens group includes a first negative lens being a spherical lens of negative power and a first positive lens being a spherical lens of positive power.

6. The optical system according to claim 5, wherein the optical system satisfies condition (1) below:

$$1.5<f1b/f1<4.0 \quad (1)$$

where, f1b is a focal length of the first rear-side sub-lens group located farther on the reduction side than the aspherical lens located furthest on the magnification side in the first lens group, and f1 is a focal length of the first lens group.

7. The optical system according to claim 5, wherein the first front-side sub-lens group includes the first negative lens and the first positive lens in this order from the magnification side toward the reduction side.

8. The optical system according to claim 5, wherein the optical system satisfies condition (2) below:

$$0.01<|d/fw|<1.50 \quad (2)$$

where, d is a space on the optical axis between a lens of negative power and a lens of positive power both located farther on the magnification side than the aspherical lens located furthest on the magnification side among the other aspherical lenses, and fw is a composite focal length of a total system of the optical system at the wide angle end.

9. The optical system according to claim 5, wherein the first negative lens is located farther on the magnification side than the aspherical lens located furthest on the magnification side among the other aspherical lenses, and satisfies condition (3) below:

$$0.5<(R1f+R1r)/(R1f-R1r)<5.0 \quad (3)$$

where,

R1f is a curvature radius of a surface, facing toward the magnification side, of the first negative lens, and R1r is a curvature radius of a surface, facing toward the reduction side, of the first negative lens.

10. The optical system according to claim 1, wherein the first lens group has positive power, the rear group includes a second lens group of positive power, a third lens group of positive power, and a fourth lens group of positive power in this order from the magnification side toward the reduction side, wherein the optical system satisfies condition (7) below:

$$3.0<f1/fp<15.0 \quad (7)$$

where, f1 is a composite focal length of a relay optical system located farther on the reduction side than the intermediate imaging position, and fp is a composite focal length of a magnifying optical system located farther on the magnification side than the intermediate imaging position.

11. The optical system according to claim 10, wherein the optical system satisfies condition (8) below:

$$2.0<|f4/ft|<10.0 \quad (8)$$

where, f4 is a focal length of the fourth lens group; and ft is a composite focal length of a total system of the optical system at a telephoto end.

12. The optical system according to claim 10, wherein the optical system satisfies condition (9) below:

$$0.4<f4/bf<1.0 \quad (9)$$

where, f4 is a focal length of the fourth lens group, and bf is a distance from a surface of a lens having power and located furthest on the reduction side to an imaging position on the reduction side.

13. The optical system according to claim 1, wherein the first lens group includes:

a high transmittance lens satisfying conditions below:

Abbe number<30; and absorption coefficient <0.008 at a wavelength of 400 nm of transmitted light, and at least one lens of negative power located farther on the magnification side than the high transmittance lens.

14. The optical system according to claim 13, wherein the lens of negative power located farther on the magnification side than the high transmittance lens has the Abbe number equal to or greater than 30.

15. The optical system according to claim 13, wherein the lens of negative power located farther on the magnification side than the high transmittance lens has an absorption coefficient equal to or greater than 0.008 at the wavelength of 400 nm of the transmitted light.

16. The optical system according to claim 13, further comprising an aperture stop, wherein the optical system satisfies condition (10) below:

$$\Phi ht/\Phi s < 0.9 \tag{10}$$

where, $\Phi ht$ is an effective diameter of the high transmittance lens, and $\Phi s$ is an aperture diameter of the aperture stop.

17. The optical system according to claim 13, wherein the optical system satisfies condition (11) below:

$$0.1 < |fht/fw| < 100.0 \tag{11}$$

where, fht is a focal length of the high transmittance lens, and fw is a composite focal length of a total system of the optical system at the wide angle end.

18. The optical system according to claim 1, wherein the optical system forms an intermediate image within the first lens group.

19. An image projection apparatus comprising:

the optical system according to claim 1; and an image forming element generating an image to be projected onto a screen.

* * * * *